US012718418B2

(12) United States Patent
Zakharchenko et al.

(10) Patent No.: US 12,718,418 B2
(45) Date of Patent: Aug. 25, 2026

(54) METHOD FOR DECODING 3D CONTENT, ENCODER, AND DECODER

(71) Applicant: GUANGDONG OPPO MOBILE TELECOMMUNICATIONS CORP., LTD., Dongguan (CN)

(72) Inventors: Vladyslav Zakharchenko, Palo Alto, CA (US); Haoping Yu, Palo Alto, CA (US); Yue Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 191 days.

(21) Appl. No.: 18/690,187

(22) PCT Filed: Sep. 9, 2022

(86) PCT No.: PCT/US2022/043104
§ 371 (c)(1),
(2) Date: Mar. 7, 2024

(87) PCT Pub. No.: WO2023/039188
PCT Pub. Date: Mar. 16, 2023

(65) Prior Publication Data

US 2024/0289997 A1 Aug. 29, 2024

Related U.S. Application Data

(60) Provisional application No. 63/243,016, filed on Sep. 10, 2021.

(51) Int. Cl.
*G06T 9/00* (2006.01)
*G06T 17/20* (2006.01)

(52) U.S. Cl.
CPC ................ *G06T 9/001* (2013.01); *G06T 9/00* (2013.01); *G06T 17/20* (2013.01)

(58) Field of Classification Search
CPC ........... G06T 9/001; G06T 9/00; G06T 17/20; G06T 9/40; G06T 17/205;
(Continued)

(56) References Cited

U.S. PATENT DOCUMENTS 6,075,540 A 6/2000 Hoppe
6,396,490 B1 5/2002 Gorman
(Continued)

FOREIGN PATENT DOCUMENTS

JP 2012068881 4/2012
KR 20100007685 1/2010
(Continued)

OTHER PUBLICATIONS

"Information technology—Coded representation of immersive media—Part 5: Visual Volumetric Video-based Coding (V3C) and Video-based Point Cloud Compression (V-PCC)," ISO/IEC 23090-5:2021(2E), ISO/IEC JTC 1/SC 29/WG 07, 2021.
(Continued)

*Primary Examiner* — Xiao M Wu
*Assistant Examiner* — Scott E Sonners
(74) *Attorney, Agent, or Firm* — Hodgson Russ LLP

(57) ABSTRACT

A method for decoding three-dimensional (3D) content comprising extracting a video frame from a video, wherein the video frame includes connectivity information associated with the 3D content; and reconstructing the 3D content based on the connectivity information. The reconstructing comprises: determining an end of the connectivity information with respect to a mesh frameblock based on a termination connectivity coding unit (CCU) in the block; and determining an end of the connectivity information with respect to a mesh frame based on a termination block in the mesh frame.

15 Claims, 16 Drawing Sheets

(58) Field of Classification Search

CPC ........... G06T 2207/10028; G06T 15/04; G06T 17/00; G06T 7/11; G06T 15/005; G06T 2200/28; G06T 7/10; G06T 7/246; G06T 7/248; G06T 7/60; G06T 19/00; G06T 2207/10016; G06T 2207/20021; G06T 11/00; G06T 3/06; H04N 19/176; H04N 19/119; H04N 19/20; H04N 19/136; H04N 19/17; H04N 19/172; H04N 19/184; H04N 19/463; H04N 13/194; H04N 13/161

See application file for complete search history.

(56) References Cited

U.S. PATENT DOCUMENTS

| | | | |
|---|---|---|---|
| 6,614,428 | B1 | 9/2003 | Lengyel |
| 6,628,277 | B1 | 9/2003 | Deering et al. |
| 6,959,114 | B2 | 10/2005 | Kim et al. |
| 6,982,715 | B2 | 1/2006 | Isenburg |
| 7,538,769 | B2 | 5/2009 | Hoppe |
| 8,502,815 | B2 | 8/2013 | Stefanoski et al. |
| 8,860,719 | B2 | 10/2014 | Ahn et al. |
| 9,607,434 | B2 | 3/2017 | Ahn et al. |
| 10,535,162 | B2 | 1/2020 | Laroche et al. |
| 10,552,987 | B2 | 2/2020 | Laroche et al. |
| 10,643,352 | B2 | 5/2020 | Hemmer et al. |
| 11,393,132 | B2 | 7/2022 | Faramarzi et al. |
| 11,915,373 | B1 | 2/2024 | Mammou |
| 12,131,508 | B2 | 10/2024 | Huang et al. |
| 12,524,917 | B2 | 1/2026 | Xu et al. |
| 12,524,920 | B2 | 1/2026 | Zakharchenko et al. |
| 12,530,813 | B2 | 1/2026 | Zakharchenko et al. |
| 12,536,709 | B2 | 1/2026 | Zakharchenko et al. |
| 12,536,710 | B2 | 1/2026 | Zakharchenko et al. |
| 2011/0046923 | A1 | 2/2011 | Lee et al. |
| 2018/0189982 | A1 | 7/2018 | Laroche et al. |
| 2019/0251734 | A1 | 8/2019 | Li et al. |
| 2019/0371045 | A1 | 12/2019 | Li et al. |
| 2020/0221125 | A1 | 7/2020 | Budagavi et al. |
| 2020/0265611 | A1 | 8/2020 | Hemmer et al. |
| 2020/0286261 | A1 | 9/2020 | Faramarzi et al. |
| 2021/0082146 | A1 | 3/2021 | Kashiwagi et al. |
| 2021/0090301 | A1 | 3/2021 | Mammou et al. |
| 2021/0248504 | A1 | 8/2021 | De Haan et al. |
| 2021/0250576 | A1 | 8/2021 | Kim |
| 2021/0279957 | A1 | 9/2021 | Eder et al. |
| 2022/0141487 | A1 | 5/2022 | Oh |
| 2022/0292684 | A1 | 9/2022 | Wang et al. |
| 2022/0392115 | A1* | 12/2022 | Mammou ............... G06T 9/001 |
| 2023/0014820 | A1 | 1/2023 | Zhang et al. |
| 2023/0090677 | A1 | 3/2023 | Zhang et al. |
| 2023/0132180 | A1 | 4/2023 | Hsieh et al. |
| 2023/0143284 | A1 | 5/2023 | Xu et al. |
| 2023/0319293 | A1 | 10/2023 | Zhang et al. |
| 2024/0242391 | A1 | 7/2024 | Zakharchenko et al. |
| 2024/0289997 | A1 | 8/2024 | Zakharchenko et al. |
| 2024/0420376 | A1 | 12/2024 | Zakharchenko et al. |
| 2024/0430480 | A1 | 12/2024 | Lee et al. |
| 2025/0024057 | A1 | 1/2025 | Nguyen Canh et al. |
| 2025/0069273 | A1 | 2/2025 | Zakharchenko et al. |
| 2025/0111545 | A1 | 4/2025 | Zakharchenko et al. |
| 2025/0131600 | A1 | 4/2025 | Zakharchenko et al. |
| 2025/0148715 | A1 | 5/2025 | Zakharchenko et al. |
| 2025/0166231 | A1 | 5/2025 | Zakharchenko et al. |
| 2025/0240453 | A1 | 7/2025 | Cao |
| 2026/0019639 | A1 | 1/2026 | Zakharchenko et al. |

FOREIGN PATENT DOCUMENTS

| | | |
|---|---|---|
| WO | 2020180161 | 9/2020 |
| WO | 2021053262 | 3/2021 |

OTHER PUBLICATIONS

Rossignac, "Edgebreaker: Connectivity compression for triangle meshes," IEEE Transactions on Visualization and Computer Graphics, Jan. 1999, vol. 5, No. 1.

Mamou et al., "TFAN: A low complexity 3D mesh compression algorithm," Computer Animation and Virtual Worlds, 2009, vol. 20.

Faramarzi et al., "Mesh Coding Extensions to MPEG-I V-PCC," IEEE 22nd International Workshop on Multimedia Signal Processing (MMSP), 2020.

WIPO, International Search Report and Written Opinion for International Application No. PCT/US2022/043086, Jan. 3, 2023.

Yang et al., "Semi-Regular Representation and Progressive Compression of 3-D Dynamic Mesh Sequences," IEEE Transactions on Image Processing, Sep. 2006, vol. 15, No. 9.

WIPO, International Search Report and Written Opinion for International Application No. PCT/US2022/043098, Feb. 3, 2023.

WIPO, International Search Report and Written Opinion for International Application No. PCT/US2022/043104, Feb. 3, 2023.

USPTO, Non-Final Office Action for U.S. Appl. No. 18/690,052, Oct. 27, 2025.

Li et al., "A Survey on Recent Approaches of Mesh Compressions," 2014 International Conference on Virtual Reality and Visualization, 2014.

Chou et al., "Dynamic Polygon Clouds: Representation and Compression for VR/AR," arXiv: 1610.00402v2, Mar. 8, 2017.

Gupta et al., "Registration and Partitioning-based Compression of 3-D Dynamic Data," IEEE transactions on circuits and systems for video technology, Nov. 2003, vol. 13, No. 11.

Kwan et al., "Packing Vertex Data into Hardware-Decompressible Textures," IEEE transactions on visualization and computer graphics, May 2018, vol. 24, No. 5.

USPTO, Final Office Action for U.S. Appl. No. 18/690,052, Feb. 11, 2026.

* cited by examiner

V-Mesh frame sequence
(attribute mapping)

Geometry
Ordered list of vertex coordinate infomation
v_idx_0: v(x,y,z)
v_idx_1: v(x,y,z)
...
v_idx_m: v(x,y,z)
frame_0
frame_1
frame_n

162

Attribute mapping
Ordered list of projected vertex attribute coordinate infomation
vt_idx_0: vt(u,v)
vt_idx_1: vt(u,v)
...
vt_idx_p: vt(u,v)
frame_0
frame_1
frame_n

164

Connectivity
Ordered list of face information with corresponding vertex index and texture index
f_idx_0: f (v_idx_1/vt_idx_1,v_idx_2/vt_idx_2, v_idx_3/vt_idx_3)
f_idx_1: f (v_idx_1/vt_idx_1,v_idx_2/vt_idx_2, v_idx_43vt_idx_3)
...
f_idx_k: f (v_idx_1/vt_idx_1,v_idx_2/vt_idx_2, v_idx_3/vt_idx_3)
frame_0
frame_1
frame_n

166

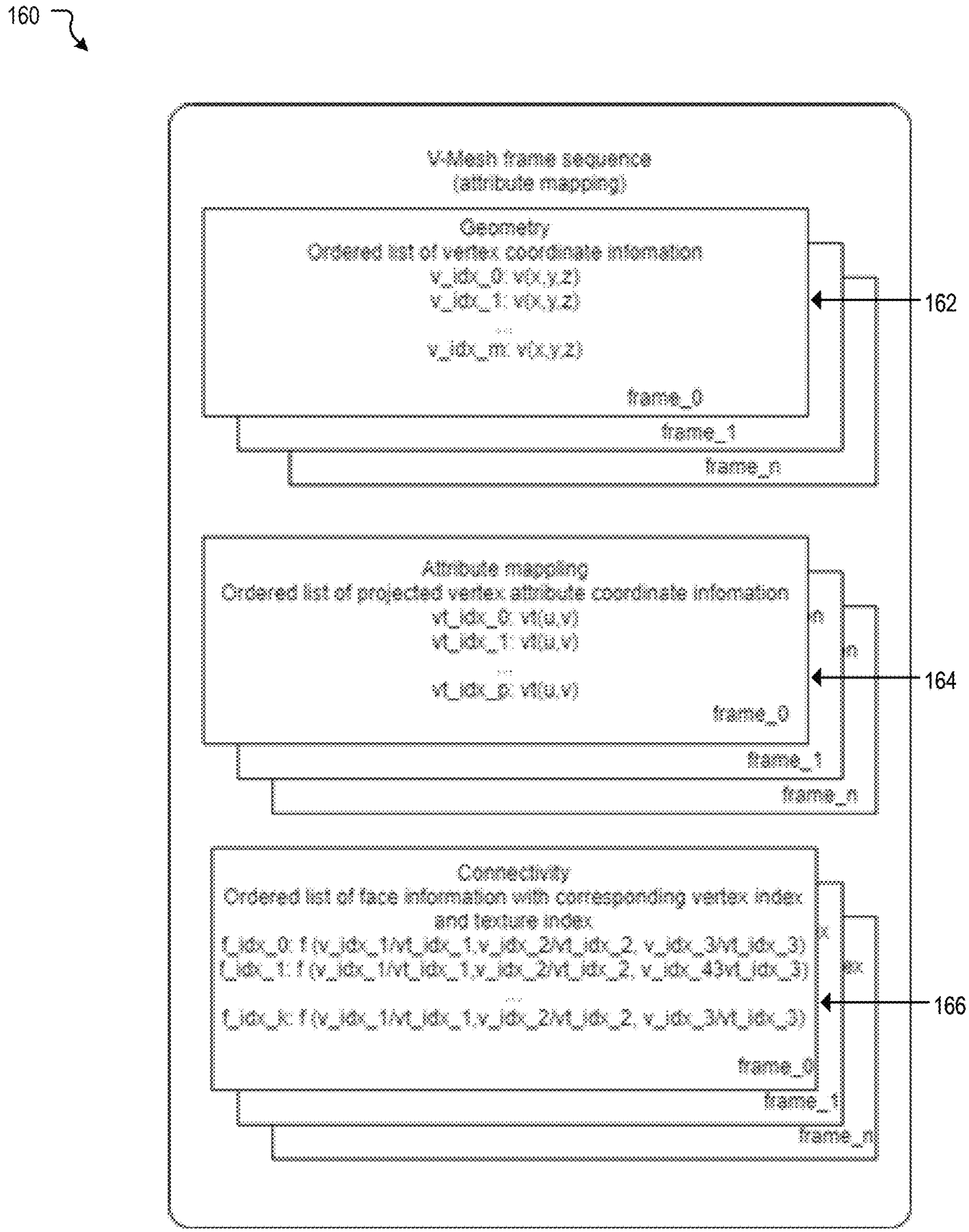

```
# ---------------------------
# Part 1 :
#  geometry information
#  X   Y   Z
# vertex 0 (v_idx_0)
v  0.0 0.0 0.0
# vertex 1 (v_idx_1)
v  1.0 0.0 0.0
# vertex 2 (v_idx_2)
v  0.0 1.0 0.0
# vertex 3 (v_idx_3)
v  0.0 0.0 1.0
# ---------------------------
# Part 2 :
#  mapping information
#  U   V
#  texture vertex 0 (vt_0)
vt 0.500000 0.500000
#  texture vertex 1 (vt_1)
vt 0.000000 0.500000
#  texture vertex 2 (vt_2)
vt 0.500000 1.000000
#  texture vertex 3 (vt_3)
vt 1.000000 0.500000
#  texture vertex 4 (vt_4)
vt 0.500000 0.000000
# ---------------------------
# Part 3 :
#  connectivity information
#  v_idx / vt_idx
# face 0 (f_idx_0)
f   0/0 1/2 2/1
# face 1 (f_idx_1)
f   0/0 3/2 1/3
# face 2 (f_idx_2)
f   0/0 2/3 3/4
```

METHOD FOR DECODING 3D CONTENT, ENCODER, AND DECODER

CROSS-REFERENCE TO RELATED APPLICATIONS

The present application is U.S. National Stage entry of International Application No. PCT/US2022/043104, filed Sep. 9, 2022, which claims priority to U.S. Provisional Patent Application No. 63/243,016, filed Sep. 10, 2021, the entire disclosures of which are incorporated herein by reference in their entireties.

BACKGROUND

Developments in three dimensional (3D) graphics technologies have led to the integration of 3D graphics in various applications. For example, 3D graphics are used in various entertainment applications such as interactive 3D environments or 3D videos. Interactive 3D environments offer immersive six degrees of freedom representation, which provides improved functionality for users. Additionally, 3D graphics are used in various engineering applications, such as 3D simulations and 3D analysis. Furthermore, 3D graphics are used in various manufacturing and architecture applications, such as 3D modeling. As developments in 3D graphics technologies have led to the integration of 3D graphics in various applications, so too have these developments led to increasing complexity associated with processing (e.g., coding, decoding, compressing, decompressing) 3D graphics. The Motion Pictures Experts Group (MPEG) of the International Organization for Standardization/International Electrotechnical Commission (ISO/IEC) has published standards with respect to coding/decoding and compression/decompression of 3D graphics. These standards include the Visual Volumetric Video-Based Coding (V3C) standard for Video-Based Point Cloud Compression (V-PCC).

BRIEF DESCRIPTION OF THE DRAWINGS

The present disclosure, in accordance with one or more various embodiments, is described in detail with reference to the following figures. The figures are provided for purposes of illustration only and merely depict typical or exemplary embodiments.

FIGS. 1E-1I illustrate various examples associated with coding and decoding connectivity information for a mesh, according to various embodiments of the present disclosure.

Figure 1A:
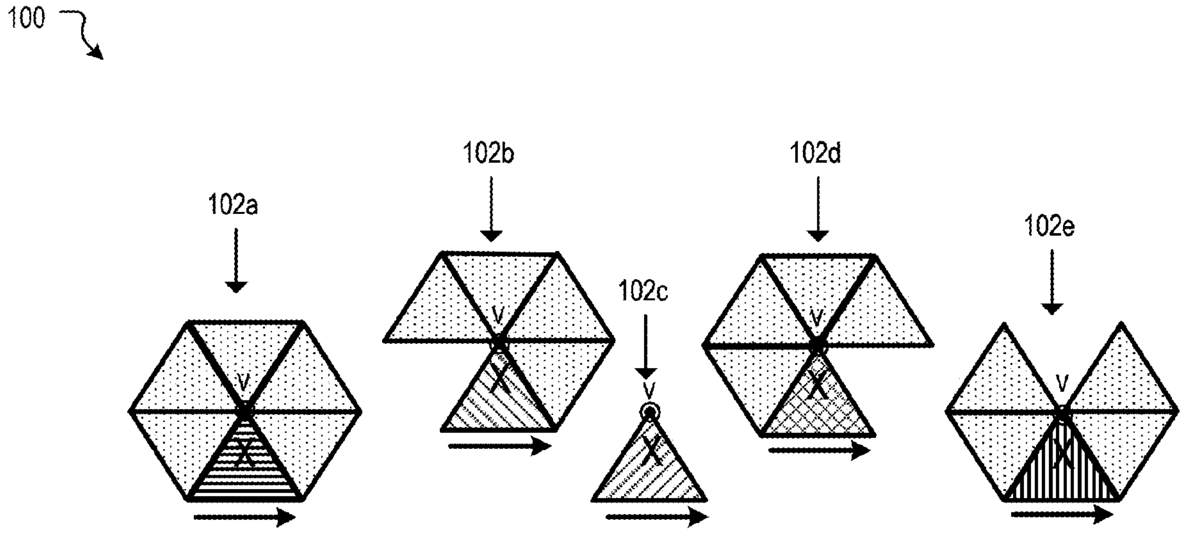
FIGS. 1A-1B illustrate various examples associated with coding and decoding connectivity information for a mesh, according to various embodiments of the present disclosure.

The figures are not exhaustive and do not limit the present disclosure to the precise form disclosed.

SUMMARY

Various embodiments of the present disclosure provide an encoder comprising at least one processor; and a memory storing instructions that, when executed by the at least one processor, cause the encoder to perform determining connectivity information for a mesh frame; segmenting the connectivity information into blocks comprising connectivity coding units; determining an end of the connectivity information prior to an end of the block; generating a termination connectivity coding unit (CCU) to indicate the end of the connectivity information prior to the end of the block; determining an end of the connectivity information prior to an end of the mesh frame; generating a termination block to indicate the end of the connectivity information prior to the end of the mesh frame; and encoding connectivity information frames comprising the connectivity information and the termination block based on a video codec.

Various embodiments of the present disclosure provide a decoder comprising at least one processor; and a memory storing instructions that, when executed by the at least one processor, cause the decoder to perform extracting a video frame from a video, wherein the video frame includes connectivity information associated with the 3D content; and reconstructing the 3D content based on the connectivity information, wherein the reconstructing comprises: determining an end of the connectivity information with respect to a block based on a termination connectivity coding unit (CCU) in the block; and determining an end of the connectivity information with respect to a mesh frame based on a termination block in the mesh frame.

Various embodiments of the present disclosure provide a method for decoding 3D content including: extracting a video frame from a video, wherein the video frame includes connectivity information associated with the 3D content; and reconstructing the 3D content based on the connectivity information, where the reconstructing comprises: determining an end of the connectivity information with respect to a block based on a termination connectivity coding unit (CCU) in the block; and determining an end of the connectivity information with respect to a mesh frame based on a termination block in the mesh frame.

These illustrative embodiments are mentioned not to limit or define the disclosure, but to provide examples to aid understanding thereof. Additional embodiments are discussed in the Detailed Description, and further description is provided there.

DETAILED DESCRIPTION

As described above, 3D graphics technologies are integrated in various applications, such as entertainment applications, engineering applications, manufacturing applications, and architecture applications. In these various applications, 3D graphics may be used to generate 3D models of incredible detail and complexity. Given the detail and complexity of the 3D models, the data sets associated with the 3D models can be extremely large. Furthermore, these extremely large data sets may be transferred, for example, through the Internet. Transfer of large data sets, such as those associated with detailed and complex 3D models, can therefore become a bottleneck in various applications. As illustrated by this example, developments in 3D graphics technologies provide improved utility to various applications but also present technological challenges. Improvements to 3D graphics technologies, therefore, represent improvements to the various technological applications to which 3D graphics technologies are applied. Thus, there is a need for technological improvements to address these and other technological problems related to 3D graphics technologies.

Accordingly, the present disclosure provides solutions that address the technological challenges described above through improved approaches to compression/decompression and coding/decoding of 3D graphics. In various embodiments, connectivity information in 3D mesh content can be efficiently coded through face sorting and normalization. 3D content, such as 3D graphics, can be represented as a mesh (e.g., 3D mesh content). The mesh can include vertices, edges, and faces that describe the shape or topology of the 3D content. The mesh can be segmented into blocks (e.g., segments, tiles). For each block, the vertex information associated with each face can be arranged in order (e.g., descending order). With the vertex information associated with each face arranged in order, the faces are arranged in order (e.g., ascending order). By sorting and normalizing the faces in each block, the 3D content represented in each block can be packed into two-dimensional (2D) frames. Sorting the vertex information can guarantee an increasing order of vertex indices, facilitating improved processing of the mesh. Further, through sorting and normalizing the faces in each block, differential coding methods can be applied to represent connectivity information in a compact form (e.g., 8-bit, 10-bit) and disjunct index prediction can be applied for different vertex indices. In various embodiments, connectivity information in 3D mesh content can be efficiently packed into coding blocks. Components of the connectivity information in the 3D mesh content can be transformed from one-dimensional (1D) connectivity components (e.g., list, face list) to 2D connectivity images (e.g., connectivity coding sample array). With the connectivity information in the 3D mesh content transformed to 2D connectivity images, video encoding processes can be applied to the 2D connectivity images (e.g., as video connectivity frames). In this way, 3D mesh content can be efficiently compressed and decompressed by leveraging video encoding solutions. In various embodiments, a video connectivity frame can be terminated by signaling a restricted (e.g., reserved, predetermined) sequence of bits in the frame. When connectivity information for 3D mesh content is coded in video connectivity frames, the number of faces in a mesh may be less than the number of coding units (e.g., samples) in a video connectivity frame. By signaling termination of a video connectivity frame, compression of 3D mesh content can be improved. Thus, the present disclosure provides solutions that address technological challenges arising in 3D graphics technologies.

Descriptions of the various embodiments provided herein may include one or more of the terms listed below. For illustrative purposes and not to limit the disclosure, exemplary descriptions of the terms are provided herein.

Mesh: a collection of vertices, edges, and faces that may define the shape/topology of a polyhedral object. The faces may include triangles (e.g., triangle mesh).

Dynamic mesh: a mesh with at least one of various possible components (e.g., connectivity, geometry, mapping, vertex attribute, and attribute map) varying in time.

Animated Mesh: a dynamic mesh with constant connectivity.

Connectivity: a set of vertex indices describing how to connect the mesh vertices to create a 3D surface (e.g., geometry and all the attributes may share the same unique connectivity information).

Geometry: a set of vertex 3D (e.g., x, y, z) coordinates describing positions associated with the mesh vertices. The coordinates (e.g., x, y, z) representing the positions may have finite precision and dynamic range.

Mapping: a description of how to map the mesh surface to 2D regions of the plane. Such mapping may be described by a set of UV parametric/texture (e.g., mapping) coordinates associated with the mesh vertices together with the connectivity information.

Vertex attribute: a scalar of vector attribute values associated with the mesh vertices.

Attribute Map: attributes associated with the mesh surface and stored as 2D images/videos. The mapping between the videos (e.g., parametric space) and the surface may be defined by the mapping information.

Vertex: a position (e.g., in 3D space) along with other information such as color, normal vector, and texture coordinates.

Edge: a connection between two vertices.

Face: a closed set of edges in which a triangle face has three edges defined by three vertices. Orientation of the face may be determined using a "right-hand" coordinate system.

Surface: a collection of faces that separates the three-dimensional object from the environment.

Connectivity Coding Unit (CCU): a square unit of size N×N connectivity coding samples that carry connectivity information.

Connectivity Coding Sample: a coding element of the connectivity information calculated as a difference of elements between a current face and a predictor face.

Block: a representation of the mesh segment as a collection of connectivity coding samples represented as three attribute channels. A block may consist of CCUs.

bits per point (bpp): an amount of information in terms of bits, which may be required to describe one point in the mesh.

Figure 1B:
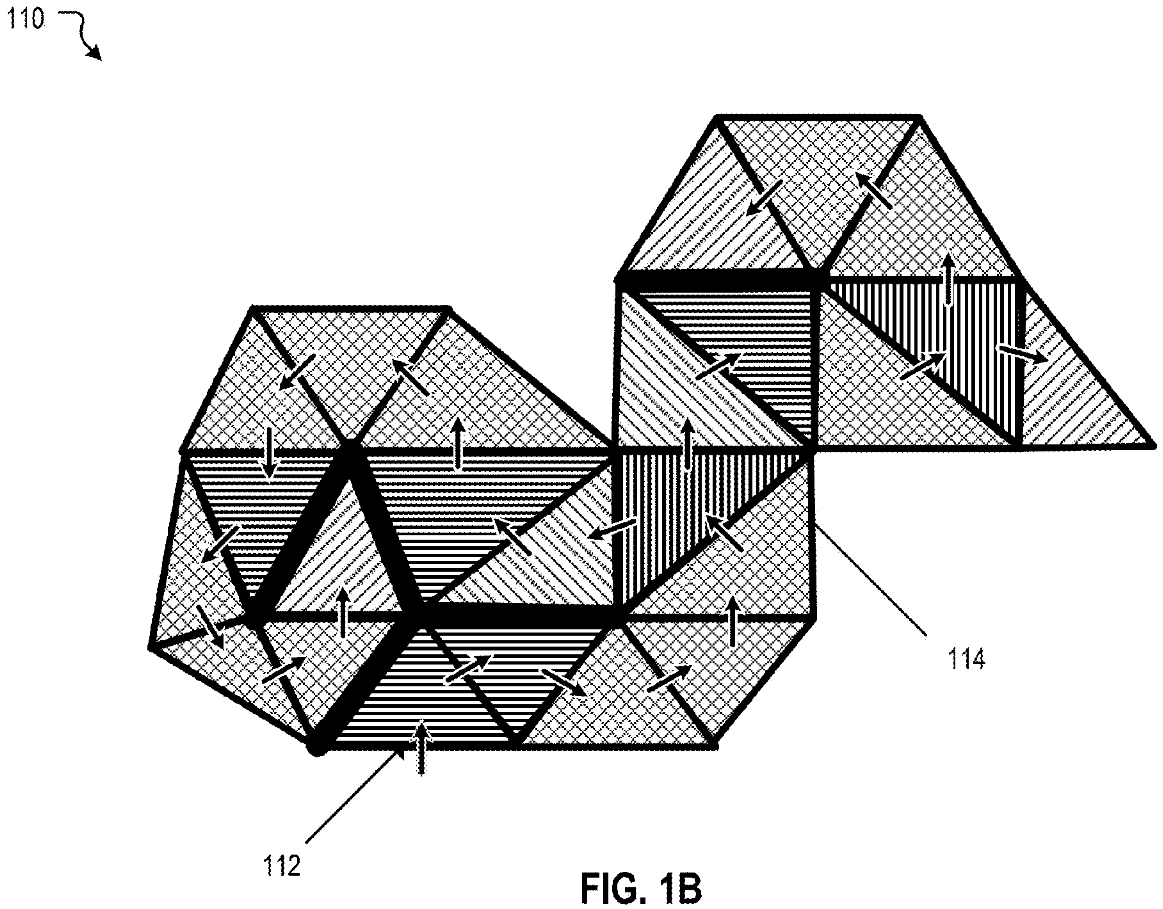

Before describing various embodiments of the present disclosure in detail, it may be helpful to describe an exemplary approach to encoding connectivity information for a mesh. FIGS. 1A-1B illustrate examples associated with coding and decoding connectivity information for a triangle mesh, according to various embodiments of the present disclosure. Various approaches to coding 3D content involves representing the 3D content using a triangle mesh. The triangle mesh provides the shape and topology of the 3D content being represented. In various approaches to coding and decoding the 3D content, the triangle mesh is traversed in a deterministic, spiral-like manner beginning with an initial face (e.g., triangle at an initial corner). The initial face can be located at the top of a stack or located at a random corner in the 3D content. By traversing the triangle mesh in a deterministic, spiral-like manner, each triangle can be marked in accordance with one of five possible cases (e.g., "C", "L", "E", "R", "S"). Coding of the triangle mesh can be performed based on the order in which traversal of the triangle mesh encounters these cases.

FIG. 1A illustrates an example 100 of vertex symbol coding for connectivity information of a triangle mesh, according to various embodiments of the present disclosure. The vertex symbol coding corresponds with cases that traversal of the triangle mesh may encounter. Case “C” 102*a* is a case where a visited face (e.g., visited triangle) has a vertex common to the visited face, a left adjacent face, and a right adjacent face, and the vertex has not been previously visited in traversal of a triangle mesh. Because the vertex has not been previously visited, the left adjacent face and the right adjacent face have also not been previously visited. In other words, in case “C” 102*a*, the vertex and faces adjacent to the visited face have not been previously visited. In case “L” 102*b*, case “E” 102*c*, case “R” 102*d*, and case “S” 102*e*, a vertex common to a visited face, a left adjacent face, and a right adjacent face has been previously visited. These cases, case “L” 102*b*, case “E” 102*c*, case “R” 102*d*, and case “S” 102*e*, describe different possible cases associated with a vertex that has been previously visited. In case “L” 102*b*, a left adjacent face of a visited face has been previously visited, and a right adjacent face of the visited face has not been previously visited. In case “E” 102*c*, a left adjacent face of a visited face and a right adjacent face of the visited face have been previously visited. In case “R” 102*d*, a left adjacent face of a visited face has not been previously visited, and a right adjacent face of the visited face has been previously visited. In case “S” 102*e*, a left adjacent face of a visited face and a right adjacent face of the visited face have not been visited. Case “S” 102*e* differs from case “C” 102*a* in that, in case “S” 102*e*, a vertex common to a visited face, a left adjacent face, and a right adjacent face has been previously visited. This may indicate that a face opposite the visited face may have been previously visited.

As described above, traversal of a triangle mesh encounters these five possible cases. Vertex symbol coding for connectivity information can be based on which case is encountered while traversing the triangle mesh. So, when traversal of a triangle mesh encounters a face corresponding with case “C” 102*a*, then connectivity information for that face can be coded as “C”. Similarly, when traversal of the triangle mesh encounters a face corresponding with case “L” 102*b*, case “E” 102*c*, case “R” 102*d*, or case “S” 102*e*, then connectivity information for that face can be coded as “L”, “E”, “R”, or “S” accordingly.

FIG. 1B illustrates an example 110 of connectivity data based on the vertex symbol coding illustrated in FIG. 1A, according to various embodiments of the present disclosure. In the example illustrated in FIG. 1B, traversal of a triangle mesh can begin with an initial face 112. As the traversal of the triangle mesh has just begun, the initial face 112 corresponds with case “C” 102*a* of FIG. 1A. Traversal of the triangle mesh continues in accordance with the arrows illustrated in FIG. 1B. The next face encountered in the traversal of the triangle mesh corresponds with case “C” 102*a* of FIG. 1A. Traversal continues, encountering a face corresponding with case “R” 102*d* of FIG. 1A, followed by another face corresponding with case “R” 102*d* of FIG. 1A, followed by another face corresponding with case “R” 102*d* of FIG. 1A, and followed by a face 114 corresponding with case “S” 102*e* of FIG. 1A. At the face 114 corresponding with case “S” 102*e* of FIG. 1A, traversal of the triangle mesh follows two paths along a left adjacent face and a right adjacent face, as illustrated in FIG. 1B. In general, traversal of the triangle mesh follows the path along the right adjacent face before returning to follow the path along the left adjacent face. Accordingly, as illustrated in FIG. 1B, traversal first follows the path along the right adjacent face, encountering faces corresponding with case “L” 102*b*, case “C” 102*a*, case “R” 102*d*, and case “S” 102*e* of FIG. 1A, respectively. As another face corresponding with case “S” 102*e* of FIG. 1A has been encountered, traversal of the triangle mesh follows two paths along a left adjacent face and a right adjacent face. Again, traversal of the triangle mesh follows the path along the right adjacent face first, which terminates with a face corresponding with case “E” 102*c* of FIG. 1A. Traversal of the path along the left adjacent face encounters face corresponding with case “R” 102*d* and case “R” 102*d* of FIG. 1A, respectively, and terminates with a face corresponding with case “E” 102*c* of FIG. 1A. Returning to face 114, and following the path along the left adjacent face, traversal of the triangle mesh encounters faces corresponding with case “L” 102*b*, case “C” 102*a*, case “R” 102*d*, case “R” 102*d*, case “R” 102*d*, case “C” 102*a*, case “R” 102*d*, case “R” 102*d*, case “R” 102*d*, and finally case “E” 102*c* of FIG. 1A, respectively. Traversal of the triangle mesh following the path along the left adjacent face terminates with the face corresponding with case “E” 102*c* of FIG. 1A. In this way, traversal of the triangle mesh illustrated in FIG. 1B is conducted in a deterministic, spiral-like manner. The resulting coding of connectivity data for the triangle mesh, in accordance with the order with which the triangle mesh was traversed, provides the coding “CCRRRSLCRSERRELCRRRCRRRE”. Further information regarding vertex symbol coding and traversal of triangle meshes is provided by Jarek Rossignac. 1999. *Edgebreaker: Connectivity Compression for Triangle Meshes*. IEEE Transactions on Visualization and Computer Graphics 5, 1 (January 1999), 47-61. https://doi.org/10.1109/2945.764870, incorporated by reference herein.

In the various approaches to coding 3D content illustrated in FIGS. 1A-1B, traversal of a triangle mesh in a deterministic, spiral-like manner ensures that each face (besides the initial face) is next to an already encoded face. This allows efficient compression of vertex coordinates and other attributes associated with each face. Attributes, such as coordinates and normals of a vertex, can be predicted from adjacent faces using various predictive algorithms, such as parallelogram prediction. This allows for efficient compression using differences between predicted and original values. By encoding each vertex of a face using the “C”, “L”, “E”, “R”, and “S” configuration symbols, information to reconstruct a triangle mesh can be minimized by encoding the mesh connectivity of the triangle mesh as the sequence by which the faces of the triangle mesh are encoded. Still, while these various approaches to coding 3D content provide for efficient encoding of connectivity information, these various approaches can be further improved, as further described herein.

Figure 1C:
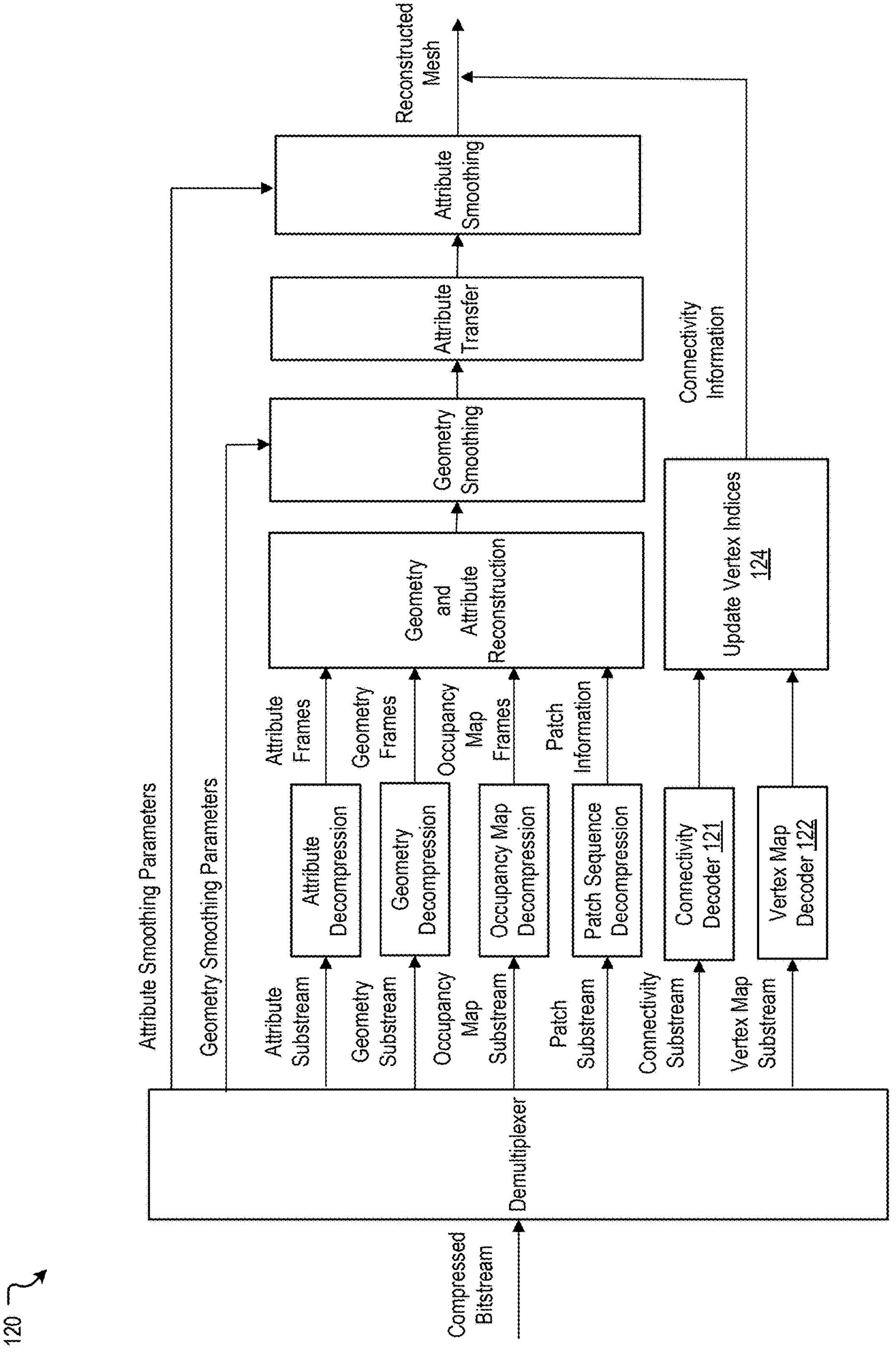
FIGS. 1C-1D illustrate various example systems associated with coding and decoding connectivity information for a mesh, according to various embodiments of the present disclosure.
Figure 1D:
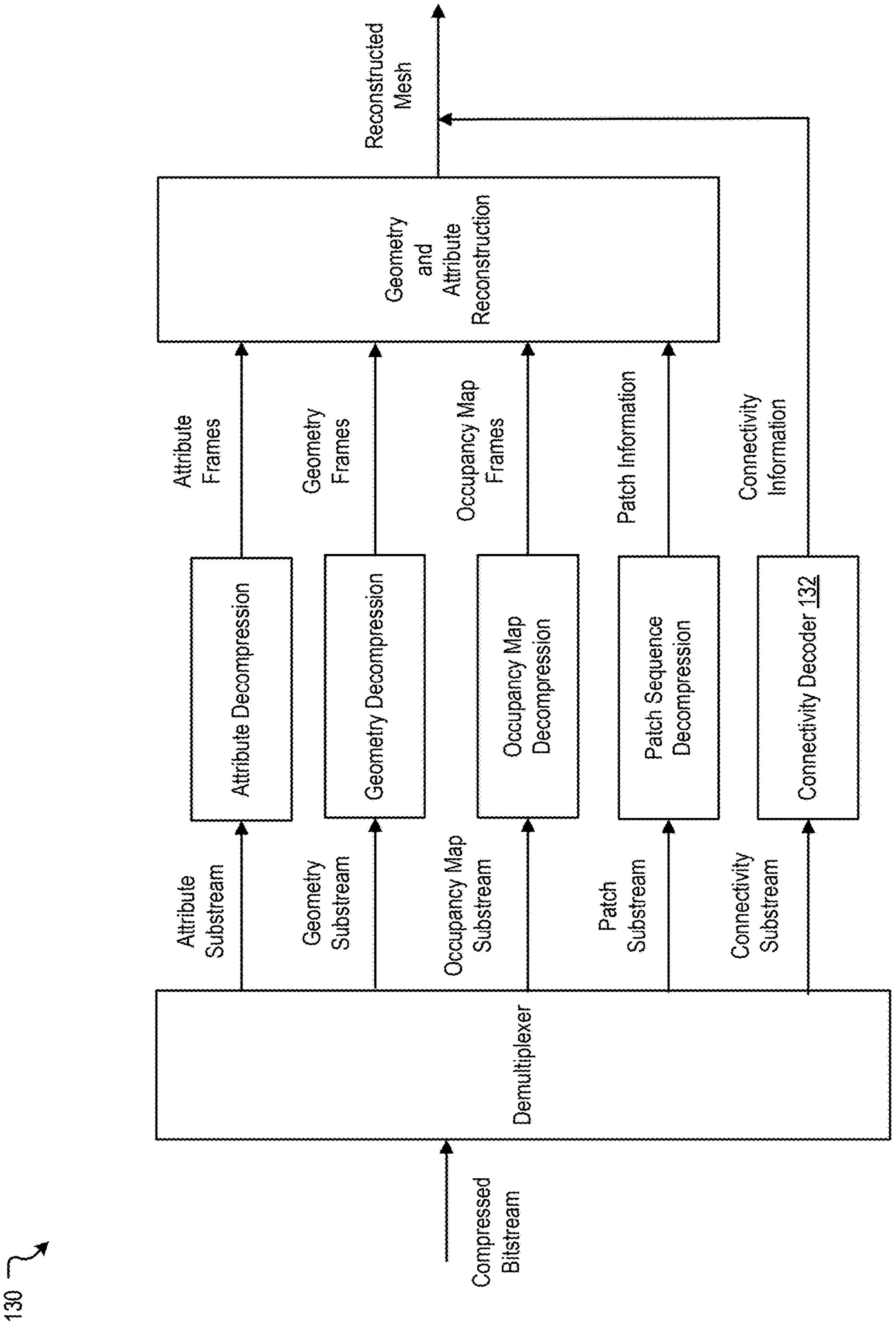

FIGS. 1C-1D illustrate example systems associated with coding and decoding connectivity information for a mesh, according to various embodiments of the present disclosure. In various approaches to coding 3D content, mesh information is encoded using a point cloud coding framework (e.g., V-PCC point cloud coding framework) with modifications to encode connectivity information and, optionally, an associated attribute map. In the point cloud coding framework, encoding the mesh information involves using a default patch generation and packing operations. Points are segmented into regular patches, and points not segmented into regular patches (e.g., not handled by the default patch generation process) are packed into raw patches. In some cases, this may result in the order of reconstructed vertices (e.g., from decoding the mesh information) to be different from that in the input mesh information (e.g., from encoding the mesh information). To address this potential issue, vertex indices may be updated to follow the order of the reconstructed vertices before encoding connectivity information.

The updated vertex indices are encoded in accordance with the traversal approach described above. In various approaches to coding 3D content, connectivity information is encoded losslessly in the traversal order of the updated vertex indices. As the updated vertex indices are of a different order than that of the input mesh information, the traversal order of the updated vertex indices is encoded along with the connectivity information. The traversal order of the updated vertex indices can be referred to as a reordering information or a vertex map. The reordering information, or the vertex map, can be encoded in accordance with various encoding approaches, such as differential coding or entropy coding. The encoded reordering information, or encoded vertex map, can be added to an encoded bitstream with the encoded connectivity information derived from the updated vertex indices. The resulting encoded bitstream can be decoded, and the encoded connectivity information and the encoded vertex map can be extracted therefrom. The vertex map is applied to the connectivity information to align the connectivity information with the reconstructed vertices.

FIG. 1C illustrates an example system 120 for decoding connectivity information for a mesh, according to various embodiments of the present disclosure. The example system 120 can decode an encoded bitstream including encoded connectivity information and an encoded vertex map as described above. As illustrated in FIG. 1C, a compressed bitstream (e.g., encoded bitstream) is received by a demultiplexer. The demultiplexer can separate the compressed bitstream into various substreams, including an attribute substream, a geometry substream, an occupancy map substream, a patch substream, a connectivity substream, and a vertex map substream. With respect to the connectivity substream (e.g., containing encoded connectivity information) and the vertex map substream (e.g., containing an encoded vertex map), the connectivity substream is processed by a connectivity decoder 121 and the vertex map substream is processed by a vertex map decoder 122. The connectivity decoder 121 can decode the encoded connectivity information in the connectivity substream to derive connectivity information for a mesh. The vertex map decoder 122 can decode the encoded vertex map in the vertex map substream. As noted above, the connectivity information for the mesh derived by the connectivity decoder 121 is based on reordered vertex indices. Therefore, the connectivity information from the connectivity decoder 121 and the vertex map from the vertex map decoder 122 are used to update vertex indices 124 in the connectivity information. The connectivity information, with the updated vertex indices, can be used to reconstruct the mesh from the compressed bitstream. Similarly, the vertex map can also be applied to reconstructed geometry and color attributes to align them with the connectivity information.

In some approaches to coding 3D content, a vertex map is not separately encoded. In such approaches (e.g., color-per-vertex), connectivity information is represented in mesh coding in absolute values with associated vertex indices. The connectivity information is coded sequentially using, for example, entropy coding. FIG. 1D illustrates an example system 130 for decoding connectivity information for a mesh where a vertex map is not separately encoded, according to various embodiments of the present disclosure. As illustrated in FIG. 1D, a compressed bitstream (e.g., encoded bitstream) is received by a demultiplexer. The demultiplexer can separate the compressed bitstream into various substreams, including an attribute substream, a geometry substream, an occupancy map substream, a patch substream, and a connectivity substream. As there is no encoded vertex map in the compressed bitstream, the demultiplexer does not produce a vertex map substream. The connectivity substream (e.g., containing connectivity information with associated vertex indices) is processed by a connectivity decoder 132. The connectivity decoder 132 decodes the encoded connectivity information to derive the connectivity information and associated vertex indices for a mesh. As the connectivity information is already associated with its respective vertex indices, the example system 130 does not update the vertex indices of the connectivity information. Therefore, the connectivity information from the connectivity decoder 132 is used to reconstruct the mesh from the compressed bitstream.

As illustrated in FIGS. 1C-1D, associating connectivity information with its respective vertex indices in some approaches to coding 3D content (e.g., color-per-vertex) offer a simplified process over other approaches to coding 3D content that use a vertex map. However, this simplified process comes with a tradeoff of with respect to limited flexibility and efficiency for information coding. Because the connectivity information and vertex indices are mixed, there is a significant entropy increase when coded. Furthermore, connectivity information uses a unique vertex index combination method for representing topography of a mesh, which increases the data size. For example, data size for connectivity information can be from approximately 16 to 20 bits per index, meaning a face is represented by approximately 48 to 60 bits. A typical data rate for information in mesh content using a color-per-vertex approach can be 170 bpp, with 60 bpp allocated for the connectivity information. Thus, while these various approaches to coding 3D content offer tradeoffs between simplicity and data size, these various approaches can be further improved with respect to both simplicity and data size, as further described herein.

Figure 1E:
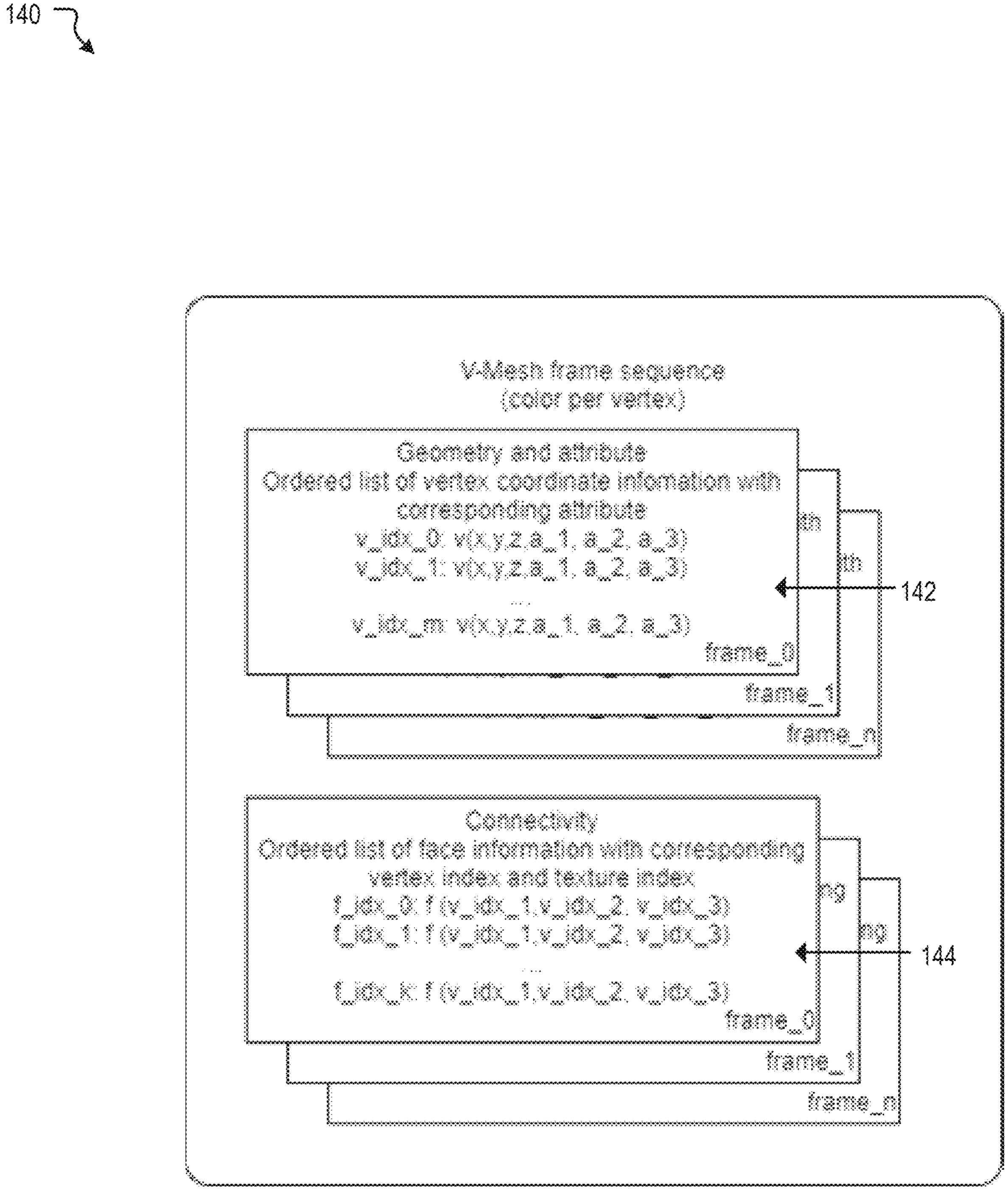

FIGS. 1E-1I illustrate examples associated with coding and decoding connectivity information for a mesh, according to various embodiments of the present disclosure. In various approaches to coding 3D content, connectivity information is encoded in mesh frames. For example, as described above, in color-per-vertex approaches, connectivity information are stored in mesh frames with associated vertex indices. FIG. 1E illustrates example mesh frames 140 associated with color-per-vertex approaches, according to various embodiments of the present disclosure. As illustrated in FIG. 1E, geometry and attribute information 142 can be stored in mesh frames as an ordered list of vertex coordinate information. Each vertex coordinate is stored with corresponding geometry and attribute information. Connectivity information 144 can be stored in mesh frames as an ordered list of face information, with each face including corresponding vertex indices and texture indices.

Figure 1F:
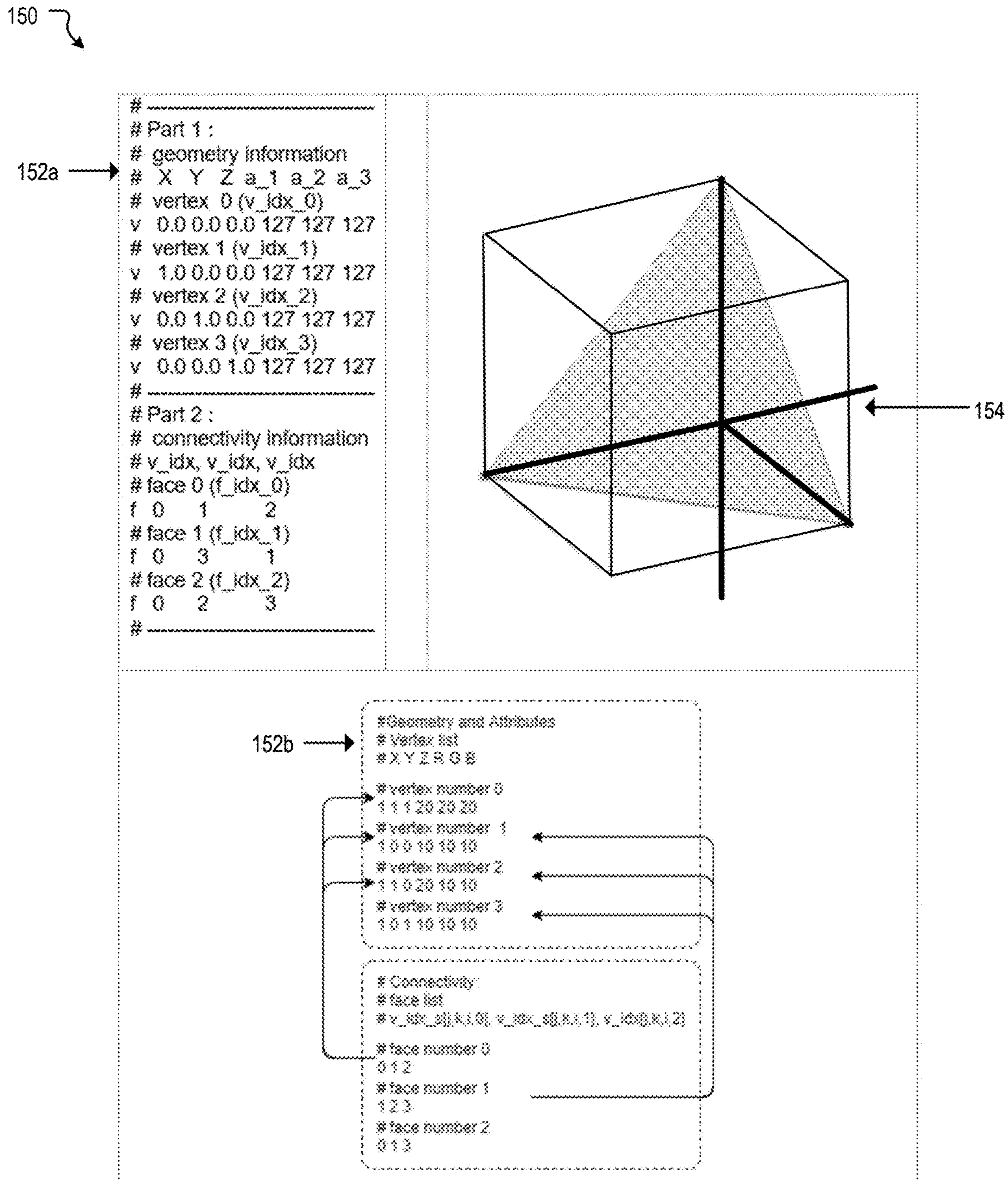

FIG. 1F illustrates an example 150 of mesh frames 152*a*, 152*b* associated with color-per-vertex approaches and a corresponding 3D content 154, according to various embodiments of the present disclosure. As illustrated in mesh frame 152*a*, geometry and attribute information as well as connectivity information are stored in a mesh frame, with geometry and attribute information stored as an ordered list of vertex coordinate information and connectivity information stored as an ordered list of face information with corresponding vertex indices and texture indices. The geometry and attribute information illustrated in mesh frame 152*a* includes four vertices. The positions of the vertices are indicated by X, Y, Z coordinates and color attributes are indicated by R, G, B values. The connectivity information illustrated in mesh frame 152*a* includes three faces. Each face includes three vertex indices listed in the geometry and attribute information to form a triangle face. As illustrated in mesh frame 152*b*, which is the same as mesh frame 152*a*, by using the vertex indices for each corresponding face to point to the geometry and attribute information stored for each vertex coordinate, the 3D content 154 (e.g., 3D triangle) can be decoded based on the mesh frames 152*a*, 152*b*.

FIG. 1G illustrates example mesh frames 160 associated with 3D coding approaches using vertex maps, according to various embodiments of the present disclosure. As illustrated in FIG. 1G, geometry information 162 can be stored in mesh frames as an ordered list of vertex coordinate information. Each vertex coordinate is stored with corresponding geometry information. Attribute information 164 can be stored in mesh frames, separate from the geometry information 162, as an ordered list of projected vertex attribute coordinate information. The projected vertex attribute coordinate information is stored as 2D coordinate information with corresponding attribute information. Connectivity information 166 can be stored in mesh frames as an ordered list of face information, with each face including corresponding vertex indices and texture indices.

Figure 1H:
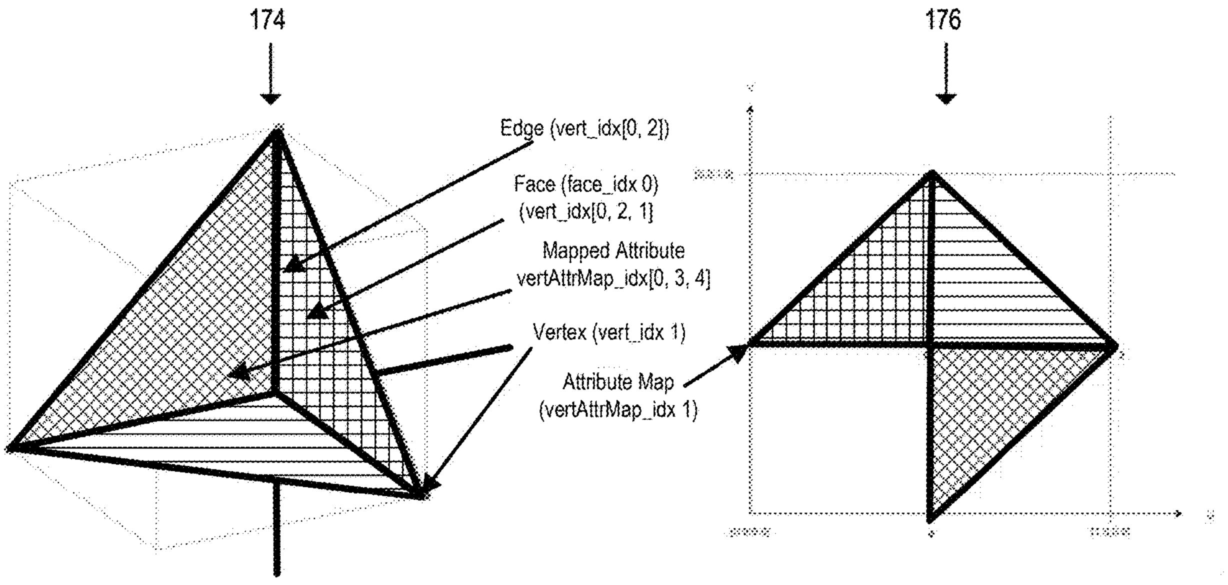

FIG. 1H illustrates an example 170 of a mesh frame 172, a corresponding 3D content 174, and a corresponding vertex map 176 associated with 3D coding approaches using vertex maps, according to various embodiments of the present disclosure. As illustrated in FIG. 1H, geometry information, mapping information (e.g., attribute information), and connectivity information are stored in the mesh frame 172. The geometry information illustrated in the mesh frame 172 includes four vertices. The positions of the vertices are indicated by X, Y, Z coordinates. The mapping information illustrated in the mesh frame 172 includes five texture vertices. The positions of the texture vertices are indicated by U, V coordinates. The connectivity information in the mesh frame 172 includes three faces. Each face includes three pairs of vertex indices and texture vertex coordinates. As illustrated in FIG. 1H, by using the pairs of vertex indices and texture vertex coordinates for each face, the 3D content 174 (e.g., 3D triangle) and the vertex map 176 can be decoded based on the mesh frame 172. Attribute information associated with the vertex map 176 can be applied to the 3D content 174 to apply the attribute information to the 3D content 174.

Figure 1I:
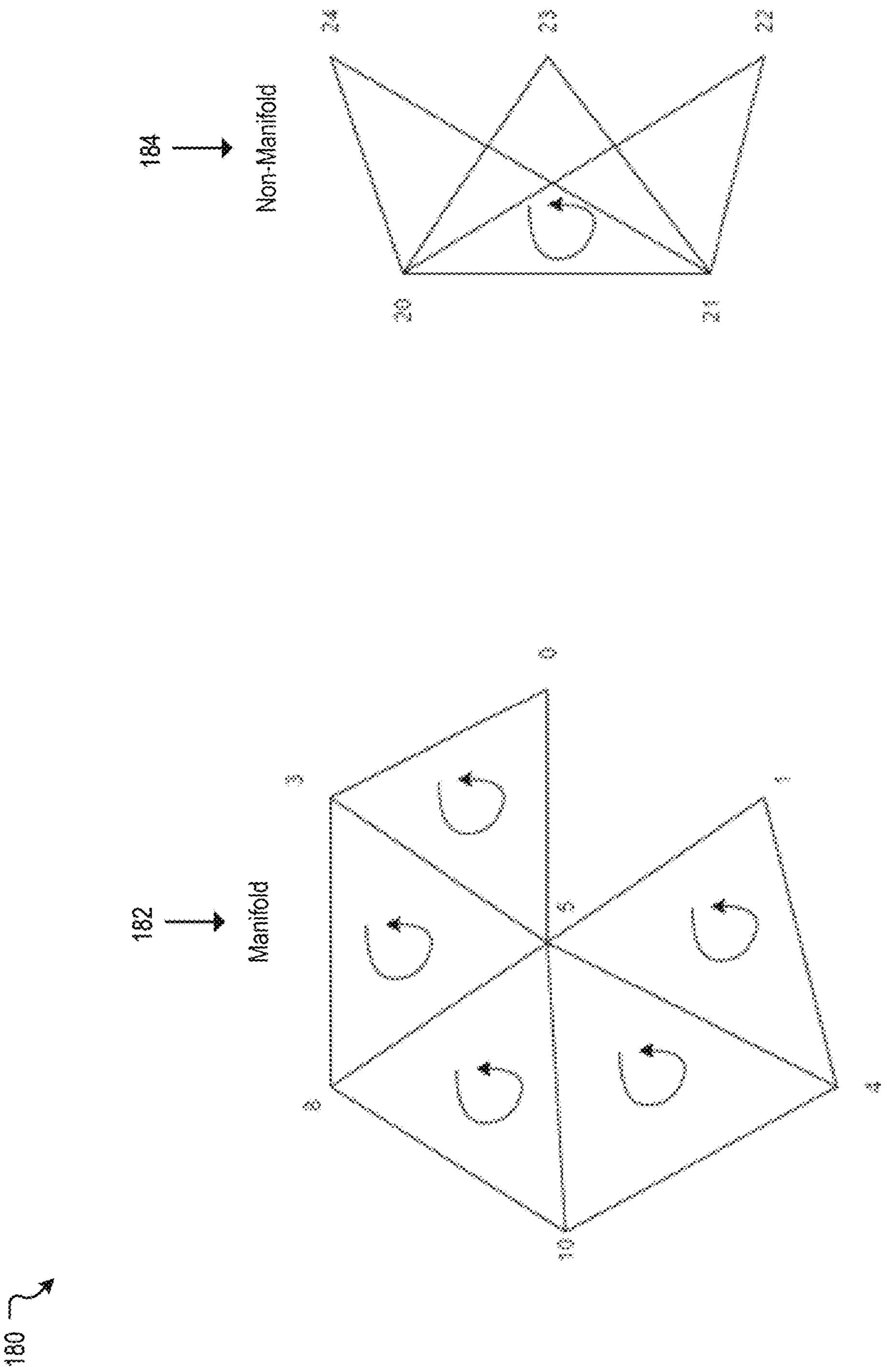

FIG. 1I illustrates an example 180 associated with determining face orientation in various 3D coding approaches, according to various embodiments of the present disclosure. As illustrated in FIG. 1I, face orientation can be determined using a right-hand coordinate system. Each face illustrated in the example 180 includes three vertices, forming three edges. Each face is described by the three vertices. In a manifold mesh 182, each edge belongs to at most two different faces. In a non-manifold mesh 184, an edge can belong to two or more different faces. In both cases of the manifold mesh 182 and the non-manifold mesh 184, the right-hand coordinate system can be applied to determine the face orientation of a face.

A coded bitstream for dynamic mesh is represented as a collection of components, which is composed of mesh bitstream header and data payload. The mesh bitstream header is comprised of the sequence parameter set, picture parameter set, adaptation parameters, tile information parameters, and supplemental enhancement information, etc. The mesh bitstream payload is comprised of the coded atlas information component, coded attribute information component, coded geometry (position) information component, coded mapping information component, and coded connectivity information component.

Figure 2A:
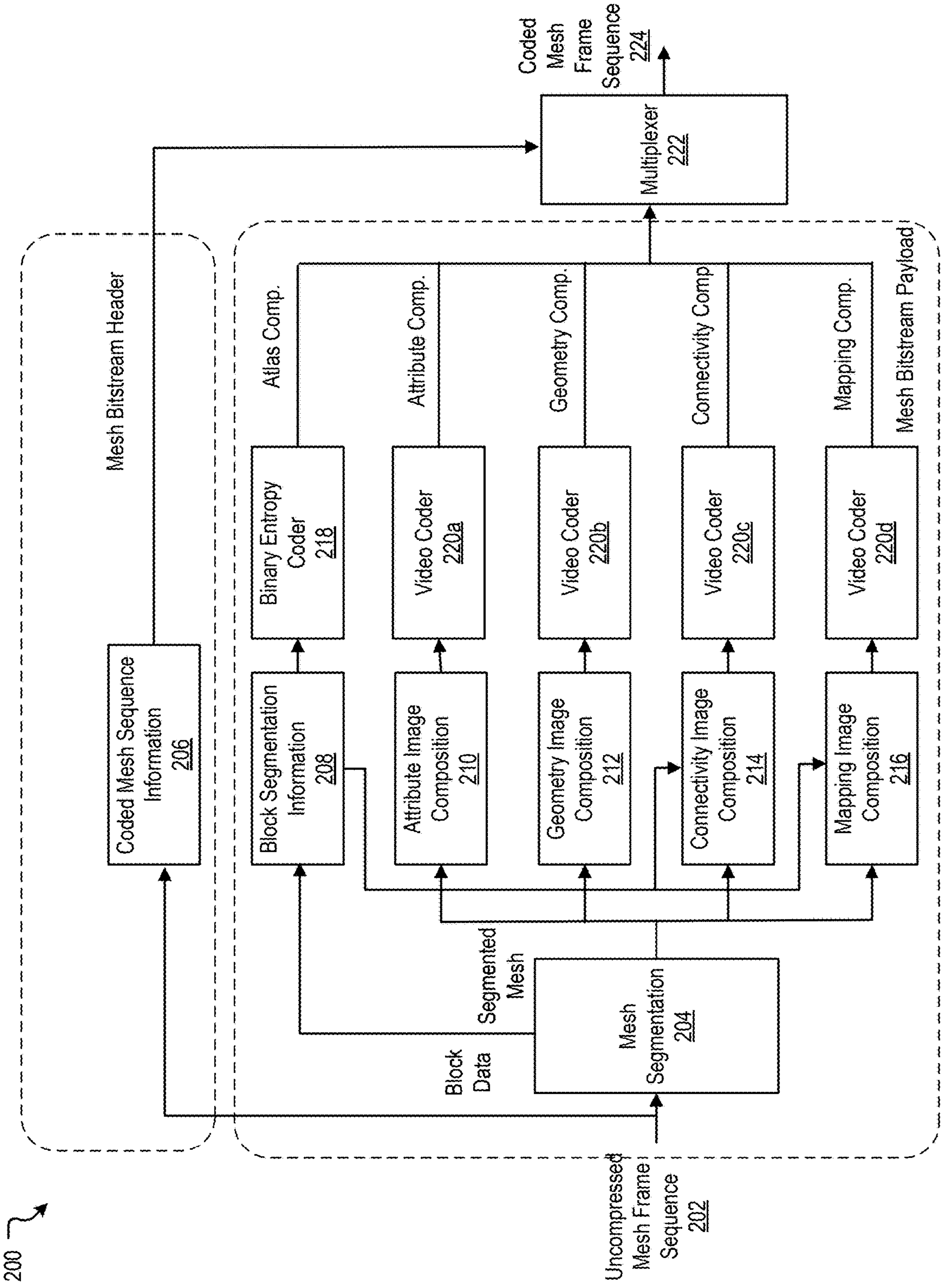
FIGS. 2A-2B illustrate various example systems associated with coding and decoding connectivity information for a mesh, according to various embodiments of the present disclosure.

FIG. 2A illustrates an example encoder system 200 for mesh coding, according to various embodiments of the present disclosure. As illustrated in FIG. 2A, an uncompressed mesh frame sequence 202 can be input to the encoder system 200, and the example encoder system 200 can generate a coded mesh frame sequence 224 based on the uncompressed mesh frame sequence 202. In general, a mesh frame sequence is composed of mesh frames. A mesh frame is a data format that describes 3D content (e.g., 3D objects) in a digital representation as a collection of geometry, connectivity, attribute, and attribute mapping information. Each mesh frame is characterized by a presentation time and duration. A mesh frame sequence (e.g., sequence of mesh frames) forms a dynamic mesh video.

As illustrated in FIG. 2A, the encoder system 200 can generate coded mesh sequence information 206 based on the uncompressed mesh frame sequence 202. The coded mesh sequence information 206 can include picture header information such as sequence parameter set (SPS), picture parameter set (PPS), and supplemental enhancement information (SEI). A mesh bitstream header can include the coded mesh sequence information 206. The uncompressed mesh frame sequence 202 can be input to mesh segmentation 204. The mesh segmentation 204 segments the uncompressed mesh frame sequence 202 into block data and segmented mesh data. A mesh bitstream payload can include the block data and the segmented mesh data. The mesh bitstream header and the mesh bitstream payload can be multiplexed together by the multiplexer 222 to generate the coded mesh frame sequence 224. The encoder system 200 can generate block segmentation information 208 (e.g., atlas information) based on the block data. Based on the segmented mesh data, the encoder system 200 can generate attribute image composition 210, geometry image composition, 212, connectivity image composition, 214, and mapping image composition 216. As illustrated in FIG. 2A, the connectivity image composition 214 and the mapping image composition 216 can also be based on the block segmentation information 208. As an example of the information generated, the block segmentation information 208 can include binary atlas information. The attribute image composition 210 can include RGB and YUV component information (e.g., RGB 4:4:4, YUV 4:2:0). The geometry image composition 212 can include XYZ vertex information (e.g., XYZ 4:4:4, XYZ 4:2:0). The connectivity image composition 214 can include vertex indices and texture vertex information (e.g., dv0, dv1, dv2 4:4:4). This can be represented as the difference between sorted vertices, as further described below. The mapping image composition 216 can include texture vertex information (e.g., UV 4:4:X). The block segmentation information 208 can be provided to a binary entropy coder 218 to generate atlas composition. The binary entropy coder 218 may be a lossless coder. The attribute image composition 210 can be provided to a video coder 220*a* to generate attribute composition. The video coder 220*a* may be a lossy coder. The geometry image composition 212 can be provided to a video coder 220*b* to generate geometry composition. The video coder 220*b* may be lossy. The connectivity image composition can be provided to video coder 220*c* to generate connectivity composition. The video coder 220*c* may be lossless. The mapping image composition 216 can be provided to video coder 220*d* to generate mapping composition. The video coder 220*d* may be lossless. A mesh bitstream payload can include the atlas composition, the attribute composition, the geometry composition, the connectivity composition, and the mapping composition. The mesh bitstream payload and the mesh bitstream header are multiplexed together by the multiplexer 222 to generate the coded mesh frame sequence 224.

In general, a coded bitstream for a dynamic mesh (e.g., mesh frame sequence) is represented as a collection of components, which is composed of mesh bitstream header and data payload (e.g., mesh bitstream payload). The mesh bitstream header is comprised of a sequence parameter set, picture parameter set, adaptation parameters, tile information parameters, and supplemental enhancement information, etc. The mesh bitstream payload can include coded atlas information component, coded attribute information component, coded geometry (position) information component, coded mapping information component, and coded connectivity information component.

Figure 2B:
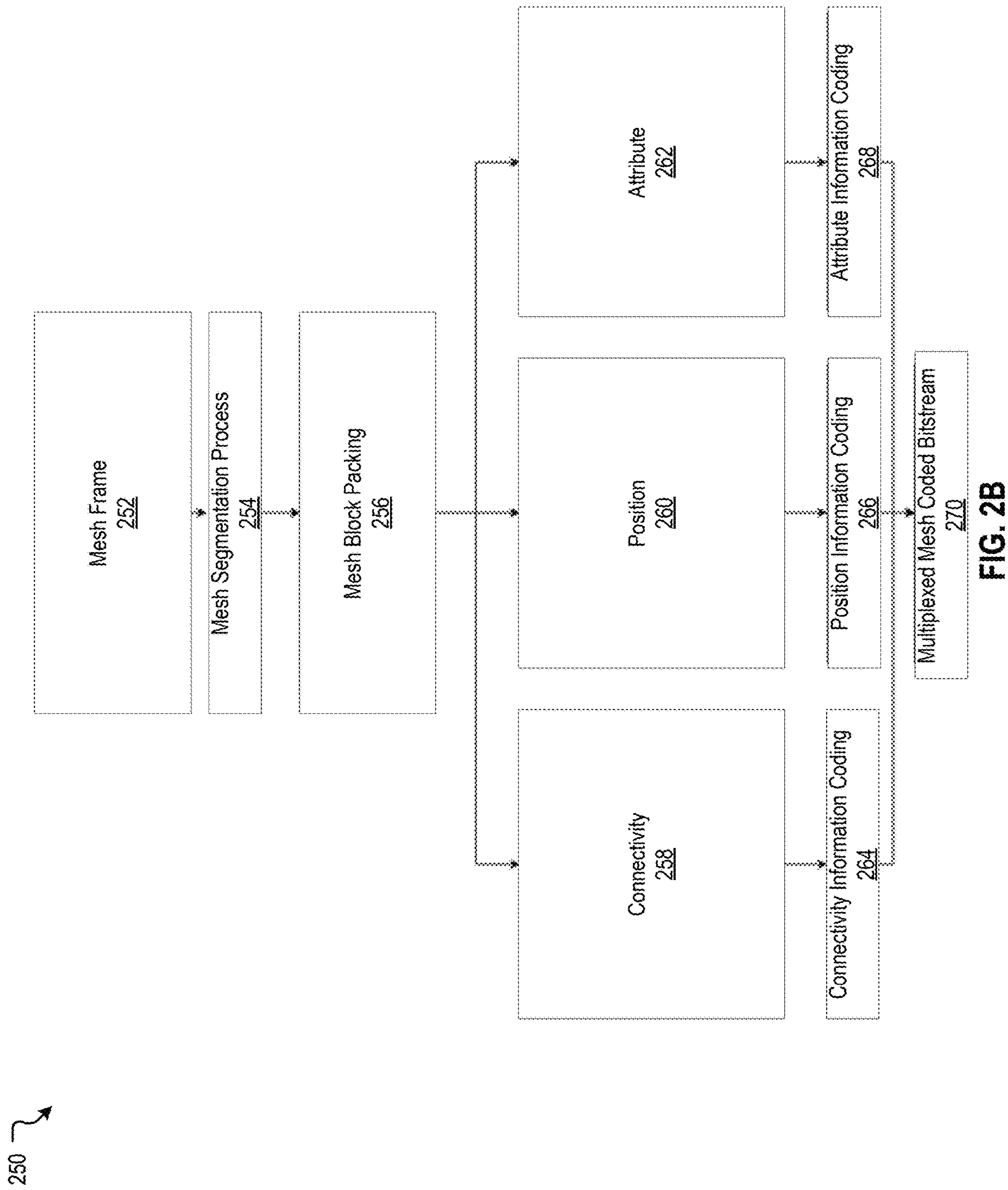

FIG. 2B illustrates an example pipeline 250 for generating a coded mesh with color per vertex encoding, according to various embodiments of the present disclosure. As illustrated by the pipeline 250, a mesh frame 252 can be provided to a mesh segmentation process 254. The mesh frame 252 can include geometry, connectivity, and attribute information. This can be an ordered list of vertex coordinates with corresponding attribute and connectivity information. For example, the mesh frame 252 can include:

v_idx_0: $v(x, y, z, a\_1, a\_2, a\_3)$ v_idx_1: $v(x, y, z, a\_1, a\_2, a\_3)$ v_idx_2: $v(x, y, z, a\_1, a\_2, a\_3)$ f_idx_0: $f$(v_idx_1, v_idx_2, v_idx_3)

f_idx_1: $f$(v_idx_1, v_idx_2, v_idx_3)

where v_idx_0, v_idx_1, v_idx_2, and v_idx_3 are vertex indices, x, y, and z are vertex coordinates, a_1, a_2, and a_3 are attribute information, and f_idx_0 and f_idx_1 are faces. A mesh is represented by vertices in the form of an array. The index of the vertices (e.g., vertex indices) is an index of elements within the array. The mesh segmentation process 254 may be non-normative. Following the mesh segmentation process, 254 is mesh block packing 256. Here, a block can be a collection of vertices that belong to a particular segment in the mesh. Each block can be characterized by block offset, relative to the mesh origin, block width, and block height. The 3D geometry coordinates of the vertices in the block can be represented in a local coordinate system, which may be a differential coordinate system with respect to the mesh origin. Following the mesh block packing 256, connectivity information 258 is provided to connectivity information coding 264. Position information 260 is provided to position information coding 266. Attribute information 262 is provided to attribute information coding 268. The connectivity information 258 can include an ordered list of face information with corresponding vertex index and texture index per block. For example, the connectivity information 258 can include:

Block_1: f_idx_0: $f$(v_idx_1, v_idx_2, v_idx_3)

Block_1: f_idx_1: $f$(v_idx_1, v_idx_2, v_idx_3)

-continued

...

Block_1: f_idx_n: $f$(v_idx_1, v_idx_2, v_idx_3)

...

Block_2: f_idx_0: $f$(v_idx_1, v_idx_2, v_idx_3)

Block_2: f_idx_1: $f$(v_idx_1, v_idx_2, v_idx_3)

Block_2: f_idx_n: $f$(v_idx_1, v_idx_2, v_idx_3)

where Block_1 and Block_2 are mesh blocks, f_idx_0, f_idx_1, and f_idx_n are faces, and v_idx_1, v_idx_2, and v_idx_3 are vertex indices. The position information 260 can include an ordered list of vertex position information with corresponding vertex index coordinates per block. For example, the position information 260 can include:

Block_1: v_idx_0: $v$(x_1, y_1, z_1)

Block_1: v_idx_1: $v$(x_1, y_1, z_1)

...

Block_1: v_idx_i: $v$(x_1, y_1, z_1)

...

Block_2: v_idx_0: $v$(x_1, y_1, z_1)

Block_2: v_idx_1: $v$(x_1, y_1, z_1)

...

Block_2: v_idx_i: $v$(x_1, y_1, z_1)

...

where Block_1 and Block_2 are mesh blocks, v_idx_0, v_idx_1, and v_idx_i are vertex indices, and x_1, y_1, and z_1 are vertex position information. The attribute information 262 can include an ordered list of vertex attribute information with corresponding vertex index attributes per block. For example, the attribute information 262 can include:

Block_1: v_idx_0: $v(R, G, B)/v(Y, U, V)$

Block_1: v_idx_1: $v(R, G, B)/v(Y, U, V)$

...

Block_1: v_idx_i: $v(R, G, B)/v(Y, U, V)$

...

Block_2: v_idx_0: $v(R, G, B)/v(Y, U, V)$

Block_2: v_idx_1: $v(R, G, B)/v(Y, U, V)$

...

Block_2: v_idx_i: $v(R, G, B)/v(Y, U, V)$

...

where Block_1 and Block_2 are mesh blocks, v_idx_0, v_idx_1, and v_idx_i are vertex indices, R, G, B are red green blue color components, and Y, U, V are luminance and chrominance components. Following the providing of the connectivity information 258 to the connectivity information coding 264, the position information 260 to the position information coding 266, and the attribute information 262 to the attribute information coding 268, the coded information is multiplexed to generated a multiplexed mesh coded bitstream 270.

To process a mesh frame, the segmentation process is applied for the global mesh frame, and all the information is coded in the form of three-dimensional blocks, whereas each block has a local coordinate system. The information required to convert the local coordinate system of the block to the global coordinate system of the mesh frame is carried in a block auxiliary information component (atlas component) of the coded mesh bitstream.

Before delving further into the details of the various embodiments of the present disclosure, it may be helpful to describe an overview of an example method for efficiently coding connectivity information in mesh content, according to various embodiments of the present disclosure. The example method can include four stages. For purpose of illustration, the examples provided herein include vertexes grouped in blocks with index j and connectivity coding units (CCUs) with index k.

In a first stage of the example method, mesh segmentation can create segments or blocks of mesh content that represent individual objects or individual regions of interest, volumetric tiles, semantic blocks, etc.

In a second stage of the example method, face sorting and vertex index normalization can provide a process of data manipulation within a mesh, or a segment where each face is first processed in a manner such that for a face with index i the associated vertices are arranged in a descending order and the vertex indices in the current normalized face are represented as a difference between the current face indices and the preceding reconstructed face indices.

In a third stage of the example method, composition of a video frame for connectivity information coding can provide a process of transformation of a one-dimensional connectivity component of a mesh frame (e.g., face list) to a two-dimensional connectivity image (e.g., connectivity coding sample array).

In a fourth stage of the example method, coding can provide a process where a packed connectivity information frame or sequence is coded by a video codec, which is indicated in SPS/PPS or an external method such as SEI information.

Figure 3A:
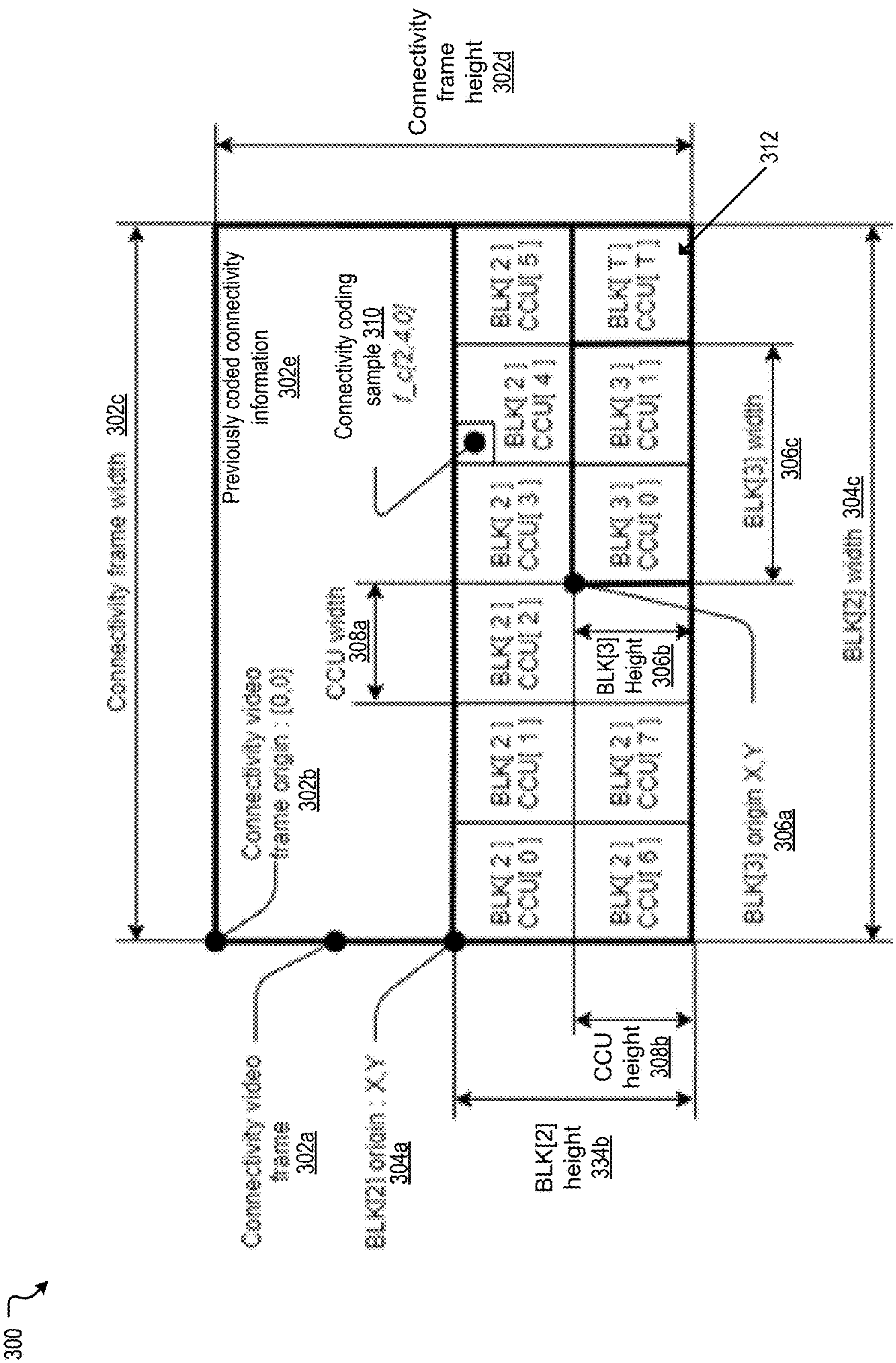
FIGS. 3A-3D illustrate various examples associated with coding and decoding connectivity information for a mesh, according to various embodiments of the present disclosure.

FIG. 3A illustrates an example 300 of data packing in a connectivity video frame, according to various embodiments of the present disclosure. In various embodiments, the example 300 can be associated with the third stage of the example method described above. As illustrated in FIG. 3A, the example 300 includes a connectivity video frame 302*a*, with the top left corner of the connectivity video frame designated as the connectivity video frame origin [0,0] 302b. The connectivity video frame 302*a* has a connectivity frame height 302*d* and a connectivity frame width 302*c*. The connectivity video frame 302*a* includes previously coded connectivity information 302*e* from which data can be packed into blocks and CCUs. As illustrated in FIG. 3A, the connectivity video frame 302*a* includes a block BLK[2] 304*a* with an origin [X, Y]. The block BLK[2] 304*a* has a BLK[2] height 304*b* and a BLK[2] width 304*c*. In this example, the block BLK[2] 304*a* has another block BLK[3] 306*a* with an origin [X, Y] overlapping the block BLK[2]. 304*a*. The block BLK[3] has a BLK[3] height 306*b* and a BLK[3] width 306*c*. In each block, data is packed into CCUs, with CCU width 308*a* and CCU height 306*b*. In each CCU, data is packed into connectivity coding samples, such as the connectivity coding sample 310. The block BLK[3] and the connectivity video frame 302*a* are terminated by a terminating block BLK[T] 312.

In various embodiments, the number of faces in a mesh may vary for different mesh frames. When the number of faces is less than the number of samples in the connectivity video frame, a video frame termination signal can indicate that the last connectivity coding sample has been retrieved. One way to indicate that the last connectivity coding sample has been retrieved from a decoded connectivity video frame is by signaling a restricted sequence of bits in the video frame. A block that starts with a restricted series of bits can be referred to as a termination block BLK[T].

In some cases, the number of faces in a mesh can be coded as mesh bitstream header information (e.g., PPS). In these cases, the termination block (e.g., BLK[T]) can store additional information for rendering or reconstruction of the mesh. In some cases, the number of vertices is not coded in the mesh bitstream header information. In these cases, the termination block (e.g., BLK[T]) can use a restricted CCU (e.g., CCU[T]) to indicate that decoding of connectivity information has been completed. For example, the restricted CCU can be a CCU with all zero information. In general, a CCU with connectivity information would not have all zero information. Therefore, a CCU with all zero information indicates that the CCU is a restricted CCU and, in these cases, indicates that decoding of connectivity information has been completed.

As one example, a CCU within a block can have a connectivity coding sample (e.g., f_c[j, k, i]) that to C, C, C. This indicates that the connectivity coding sample is a duplicate (e.g., duplicated face). In general, connectivity coding samples do not have duplicated faces. Therefore, the C, C, C information in a connectivity coding sample can serve as an indication of an end of a CCU. If a block starts with a CCU that begins with a duplicated face (e.g., f_c[j, k, i]=(C, C, C)), this can be an indication that the block is a termination block in the current mesh connectivity frame.

Figure 3B:
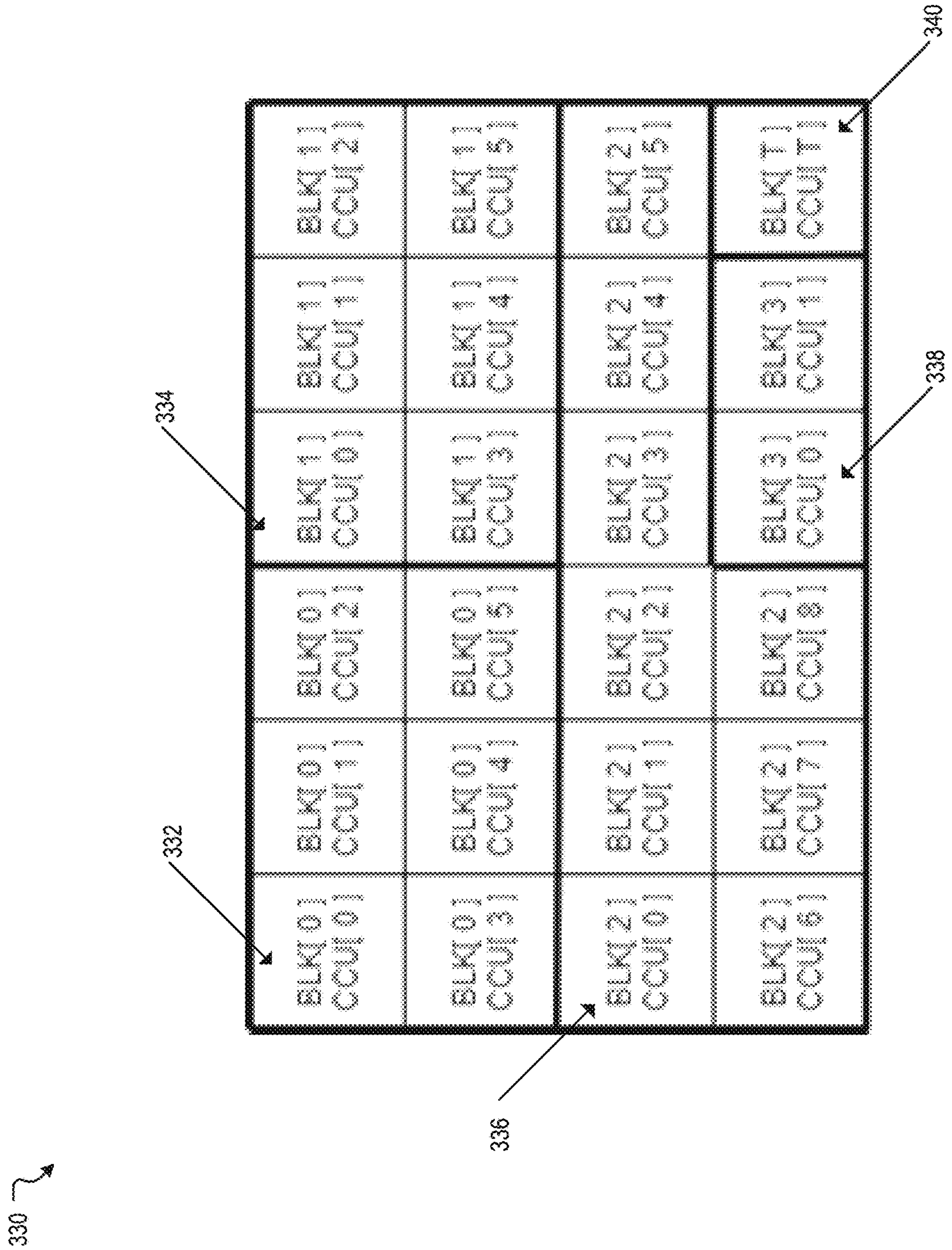

FIG. 3B illustrates an example 330 of a mesh connectivity frame with a terminating block, according to various embodiments of the present disclosure. As illustrated in FIG. 3B, the mesh connectivity frame includes four blocks 332, 334, 336, 338. The first block 332 contains 6 CCUs, has a width of 3 CCUs, and has a height of 2 CCUs. The second block 334 contains 6 CCUs, has a width of 3 CCUs, and has a height of 2 CCUs. The third block 336 contains 9 CCUS, has a width of 6 CCUs, and has a height of 2 CCUs. The fourth block 338 overlaps the third block 336. The fourth block 338 has 2 CCUS, has a width of 2 CCUs, and a height of 1 CCU. The termination block 340 indicates the end of the mesh connectivity frame. For example, the termination block 340 can start with a CCU that begins with a connectivity coding sample indicating a duplicated face (e.g., C, C, C).

Figure 3C:
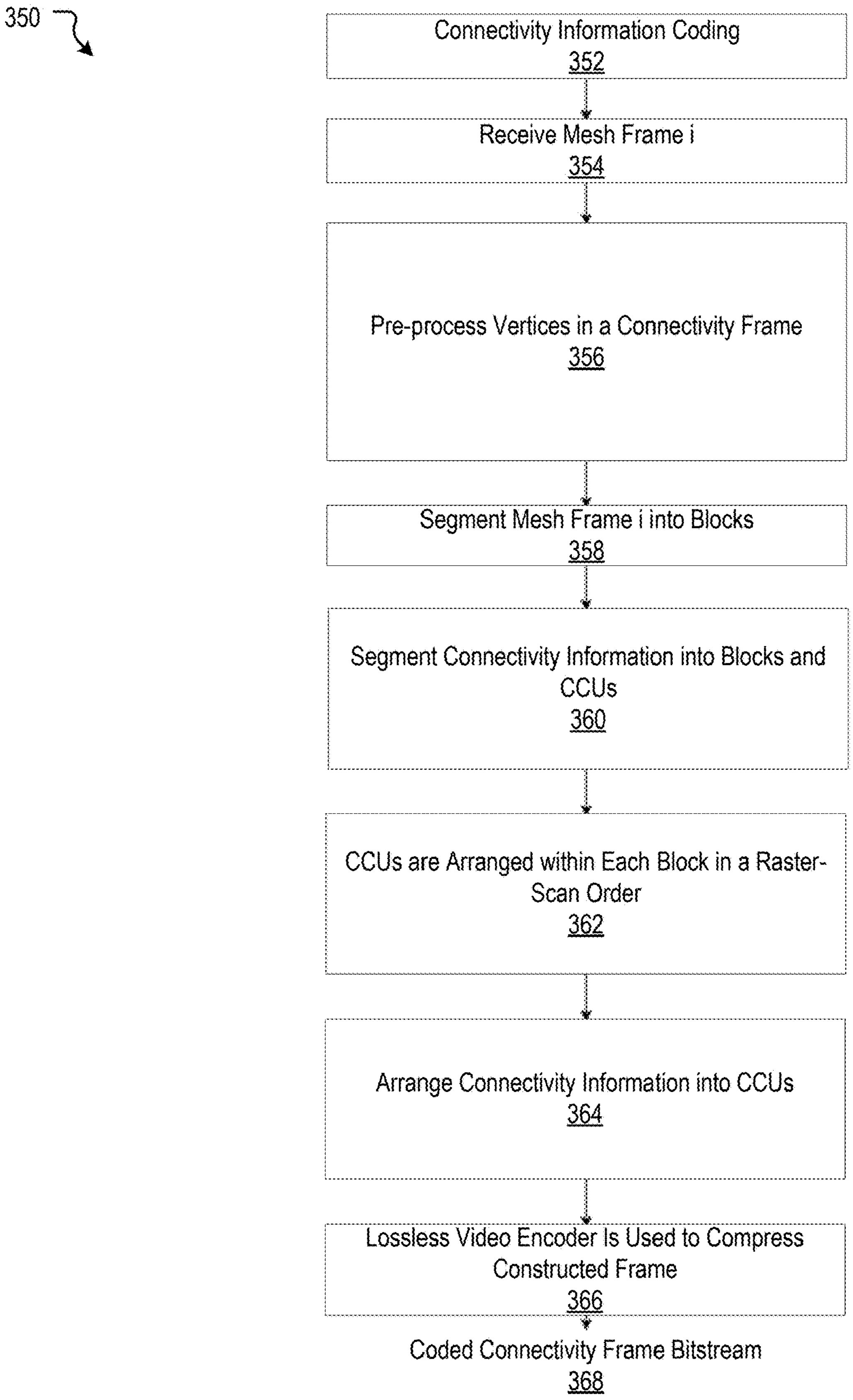

FIG. 3C illustrates an example workflow 350 associated with mesh connectivity information encoding, according to various embodiments of the present disclosure. For illustrative purposes, the example workflow 350 can demonstrate an example of a complete workflow for encoding 3D content. As illustrated in FIG. 3C, at step 352, the workflow 350 begins with connectivity information coding. At step 354, mesh frame i is received. The mesh frame can be received, for example, from a receiver or other input device. At step 356, the vertices in a connectivity frame are pre-processed. The pre-processing can be performed, for example, by:

1 Sort by rotating vertex index WITHIN face i such that $$v\_idx[i, 0] > v\_idx[i, 1] \,||\, v\_idx[i, 0] > v\_idx[i, 2]$$

2. Son all faces [0 . . . L–1] such that $$v\_idx[i, 0] > v\_idx[i-1, 0]$$

for face f(0, 1, 2)

valid rotaions are: (1, 2, 0), (2, 0, 1)

invalid rotations are: (0, 2, 1), (1, 0, 2), (2, 1, 0)

where v_idx[i, 0], v_idx[i–1, 0], v_idx[i, 1], and v_idx[i, 2] are vertex indices and face f(0, 1, 2) is a face. At step 358, the mesh frame i is segmented into blocks. For example, the mesh frame i can be segmented into blocks [0 . . . J–1]. At step 360, connectivity information is segmented into blocks and CCUs. Step 360 can involve converting a 2D vertex list to a 4D vertex list. For example, step 360 can be performed by:

$$v\_idx[i, 0] = v\_idx[j, k, i, 0]$$

$$v\_idx[i, 1] = v\_idx[j, k, i, 1]$$

$$v\_idx[i, 2] = v\_idx[j, k, i, 2]$$

where v_idx[i, 0], v_idx[j, k, i, 0], v_idx[i, 1], v_idx[j, k, i, 1], v_idx[i, 2], v_idx[j, k, i, 2] are vertex indices. At step 362, CCUs are arranged within each block in a raster-scan order. For example, step 362 can be performed for each CCU k, by:

$$ccu[j, k], f\_c[0] = ccu[k-1], f\_c[0]$$

$$dv\_idx[j, k, 0, 0] = C + v\_idx\_s[j, k, 0, 0] - v\_idx\_s[j, k-1, 0, 0]$$

$$dv\_idx[j, k, 0, 1] = C + v\_idx\_s[j, k, 0, 1] - v\_idx\_s[j, k-1, 0, 1]$$

$$dv\_idx[j, k, 0, 2] = C + v\_idx\_s[j, k, 0, 2] - v\_idx\_s[j, k-1, 0, 2]$$

where ccu[j, k] and ccu[k–1] are CCUs, f_c[0] and f_c[0] are faces, dv_idx[j, k, 0, 0], dv_idx[j, k, 0, 1], and dv_idx[j, k, 0, 2] are texture vertex information, v_idx_s[j, k, 0, 1], v_idx_s [j, k–1, 0, 1], v_idx_s[j, k, 0, 2], and v_idx_s [j, k–1, 0, 2] are segment vertex indices. At step 364, connectivity information can be arranged into CCUs. The CCUs can be include 2D arrays of N×N connectivity coding samples in a raster scan-order, where:

dv_idx[j, k, i, 0] corresponds to channel_0 (Y)

dv_idx[j, k, i, 1] corresponds to channel_0 (U)

dv_idx[j, k, 2] corresponds to channel_0 (V)

where dv_idx[j, k, i, 0], dv_idx[j, k, i, 1], and dv_idx[j, k, i, 2] are texture vertex information. At step 366, a lossless video encoder can be used to compress the constructed frame. At step 368, a coded connectivity frame bitstream is produced.

Figure 3D:
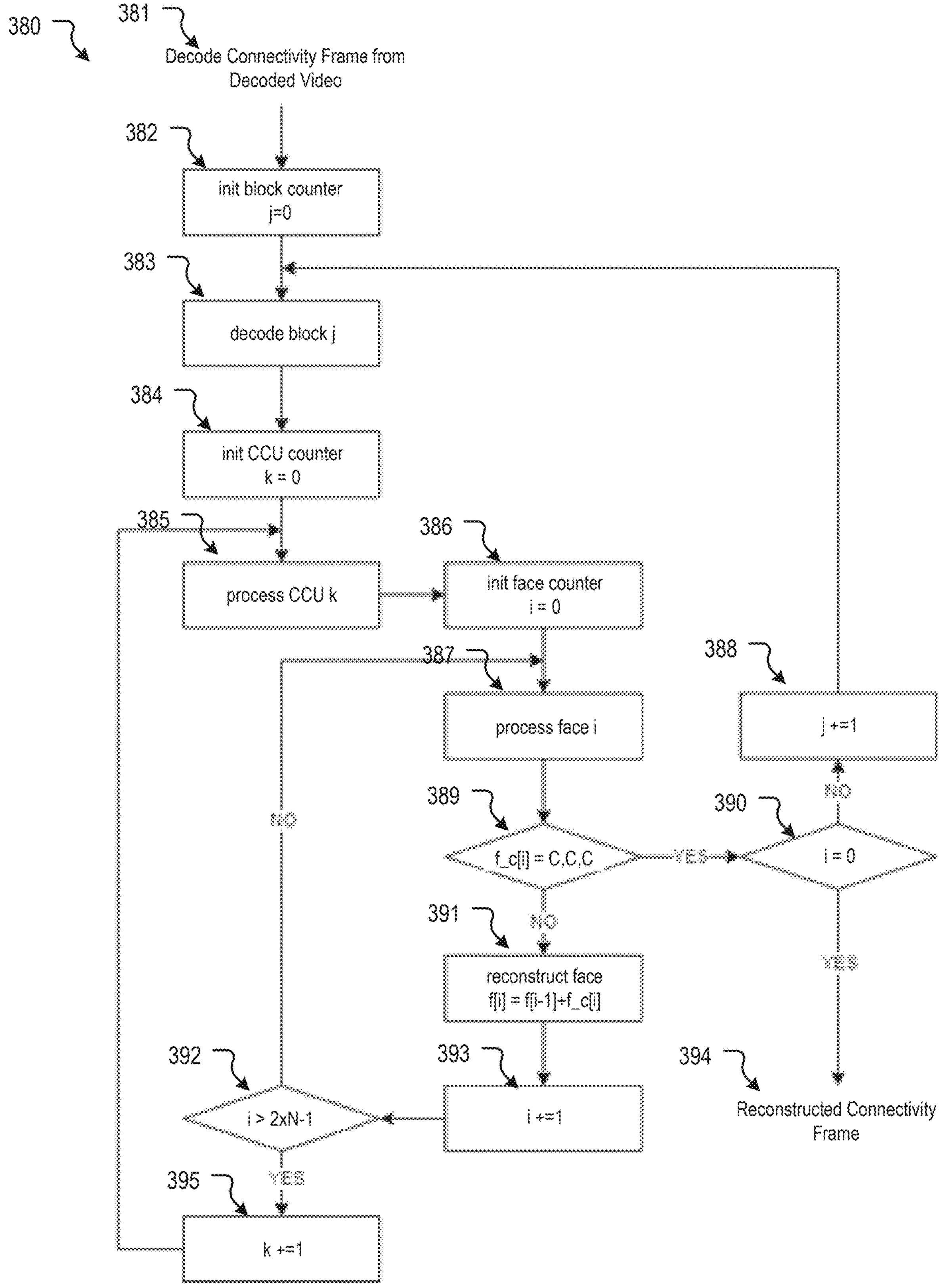

FIG. 3D illustrates an example workflow 380 for reconstructing (e.g., decoding) connectivity information, according to various embodiments of the present disclosure. In general, reconstructing connectivity information can be illustrated as a two stage process.

In a first stage, the connectivity component is extracted from the coded dynamic mesh bitstream and is decoded as an image. A pixel of the decoded video frame corresponds to a connectivity sample.

In a second stage, block size and position information and CCU resolution information are extracted from the header. The decoded connectivity video frame is further processed to reconstruct mesh connectivity information.

As illustrated in FIG. 3D, the example workflow 380 begins at step 381, with a connectivity frame decoded from decoded video. At step 382, a block counter j is initialized to 0. At step 383, block j is decoded. At step 384, a CCU counter k is initialized to 0. At step 385, CCU k is processed. At step 386, a face counter i is initialized to 0. At step 387, face i is processed. At step 389, a determination is made if face i is a terminating signal. If the determination at step 389 is no, then at step 391, face i is reconstructed. At step 393, face counter i is incremented. At step 392, a determination is made if the face counter indicates that an end of frame is reached. If the determination at step 392 is no, then the workflow 380 returns to step 387 to process the next face. If the determination at step 392 is yes, then the workflow 380 proceeds to step 395. At step 395, the CCU counter k is incremented and the workflow 380 proceeds to step 385. If, at step 389, the determination is yes, then at step 390, a determination is made if the face counter is 0. If the determination at step 390 is no, then the block counter j is incremented, and the workflow 380 proceeds to step 383. If the determination at step 390 is yes, then the connectivity frame has been decoded. At step 394, the connectivity frame is reconstructed.

Figure 4:
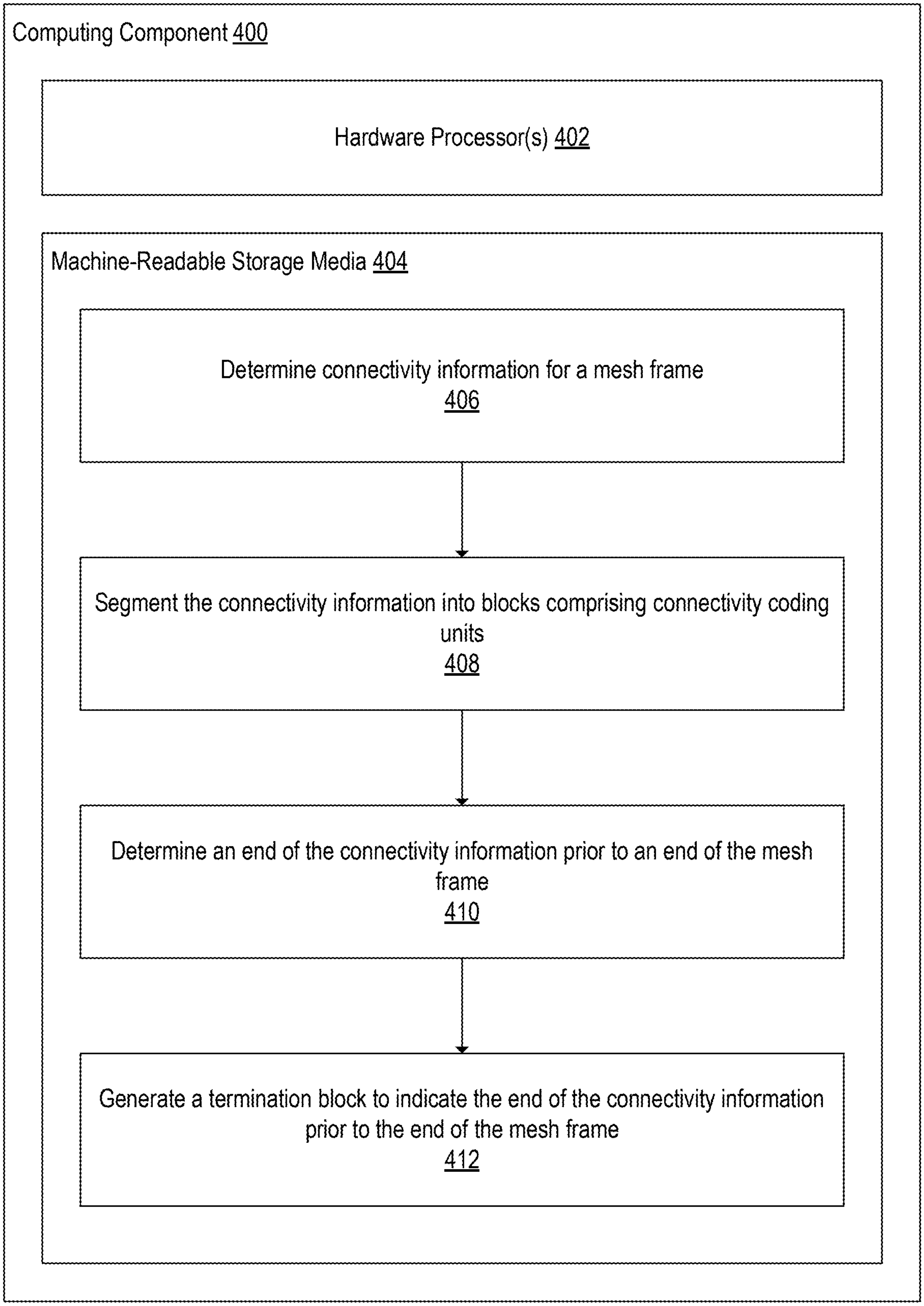
FIG. 4 illustrates a computing component that includes one or more hardware processors and machine-readable storage media storing a set of machine-readable/machine-executable instructions that, when executed, cause the one or more hardware processors to perform an illustrative method for coding and decoding connectivity information, according to various embodiments of the present disclosure.

FIG. 4 illustrates a computing component 400 that includes one or more hardware processors 402 and machine-readable storage media 404 storing a set of machine-readable/machine-executable instructions that, when executed, cause the one or more hardware processors 402 to perform an illustrative method for encoding connectivity information for a mesh, according to various embodiments of the present disclosure. For example, the computing component 400 can perform functions described with respect to FIGS. 1A-1I, 2A-2B, and 3A-3D. The computing component 400 may be, for example, the computing system 500 of FIG. 5. The hardware processors 402 may include, for example, the processor(s) 504 of FIG. 5 or any other processing unit described herein. The machine-readable storage media 404 may include the main memory 506, the read-only memory (ROM) 508, the storage 510 of FIG. 5, and/or any other suitable machine-readable storage media described herein.

At block 406, the hardware processor(s) 402 may execute the machine-readable/machine-executable instructions stored in the machine-readable storage media 404 to determine connectivity information for a mesh frame.

At block 408, the hardware processor(s) 402 may execute the machine-readable/machine-executable instructions stored in the machine-readable storage media 404 to segment the connectivity information into blocks comprising connectivity coding units.

At block 410, the hardware processor(s) 402 may execute the machine-readable/machine-executable instructions stored in the machine-readable storage media 404 to determine an end of the connectivity information prior to an end of the mesh frame.

At block 412, the hardware processor(s) 402 may execute the machine-readable/machine-executable instructions stored in the machine-readable storage media 404 to generate a termination connectivity coding unit (CCU) to indicate the end of the connectivity information prior to the end of the block. An end of the connectivity information prior to an end of the mesh frame can be determined. A termination block can be generated to indicate the end of the connectivity information prior to the end of the mesh frame.

Figure 5:
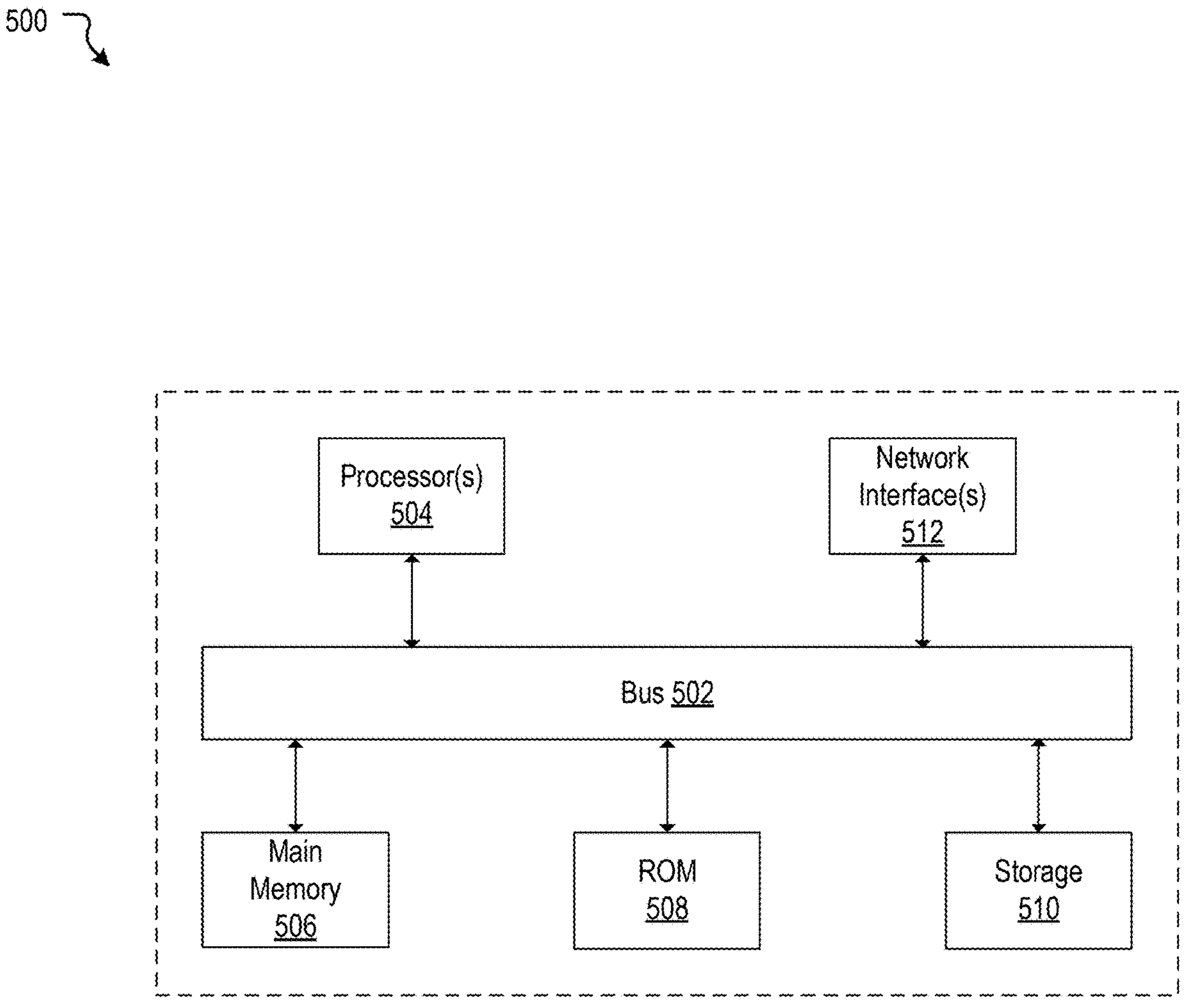
FIG. 5 illustrates a block diagram of an example computer system in which various embodiments of the present disclosure may be implemented.

FIG. 5 illustrates a block diagram of an example computer system 500 in which various embodiments of the present disclosure may be implemented. The computer system 500 can include a bus 502 or other communication mechanism for communicating information, one or more hardware processors 504 coupled with the bus 502 for processing information. The hardware processor(s) 504 may be, for example, one or more general purpose microprocessors. The computer system 500 may be an embodiment of a video encoding module, video decoding module, video encoder, video decoder, or similar device.

The computer system 500 can also include a main memory 506, such as a random access memory (RAM), cache and/or other dynamic storage devices, coupled to the bus 502 for storing information and instructions to be executed by the hardware processor(s) 504. The main memory 506 may also be used for storing temporary variables or other intermediate information during execution of instructions by the hardware processor(s) 504. Such instructions, when stored in a storage media accessible to the hardware processor(s) 504, render the computer system 500 into a special-purpose machine that can be customized to perform the operations specified in the instructions.

The computer system 500 can further include a read only memory (ROM) 508 or other static storage device coupled to the bus 502 for storing static information and instructions for the hardware processor(s) 504. A storage device 510, such as a magnetic disk, optical disk, or USB thumb drive (Flash drive), etc., can be provided and coupled to the bus 502 for storing information and instructions.

Computer system 500 can further include at least one network interface 512, such as a network interface controller module (NIC), network adapter, or the like, or a combination thereof, coupled to the bus 502 for connecting the computer system 500 to at least one network.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 500, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques or technology described herein using customized hard-wired logic, one or more ASICs or FPGAs, firmware and/or program logic which in combination with the computer system 500 that causes or programs the computer system 500 to be a special-purpose machine. According to one or more embodiments, the techniques described herein are performed by the computer system 500 in response to the hardware processor(s) 504 executing one or more sequences of one or more instructions contained in the main memory 506. Such instructions may be read into the main memory 506 from another storage medium, such as the storage device 510. Execution of the sequences of instructions contained in the main memory 506 can cause the hardware processor(s) 504 to perform process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 510. The volatile media can include dynamic memory, such as the main memory 506. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, an NVRAM, any other memory chip or cartridge, and networked versions of the same.

Non-transitory media is distinct from but may be used in conjunction with transmission media. The transmission media can participate in transferring information between the non-transitory media. For example, the transmission media can include coaxial cables, copper wire and fiber optics, including the wires that comprise the bus 502. The transmission media can also take a form of acoustic or light waves, such as those generated during radio-wave and infra-red data communications.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 518, which carry the digital data to and from computer system 500, are example forms of transmission media.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An encoder for encoding three-dimensional (3D) content comprising:

at least one processor; and a memory storing instructions that, when executed by the at least one processor, cause the encoder to perform:

determining connectivity information for a mesh frame;

segmenting the connectivity information into blocks comprising connectivity coding units;

determining an end of the connectivity information prior to an end of a block of the blocks comprising the connectivity coding units;

generating a termination connectivity coding unit (CCU) to indicate the end of the connectivity information prior to the end of the block, wherein the termination CCU includes information indicative of a duplicated face;

determining an end of the connectivity information prior to an end of the mesh frame;

generating a termination block to indicate the end of the connectivity information prior to the end of the mesh frame; and encoding connectivity information frames comprising the connectivity information and the termination block based on a video codec.

2. The encoder of claim 1, wherein the termination block includes a restricted sequence of bits.

3. The encoder of claim 1, wherein the termination block includes a CCU that includes all zero information.

4. The encoder of claim 1, wherein the termination block starts with a CCU with information indicative of a termination signal.

5. The encoder of claim 1, wherein the termination block comprises information for rendering the mesh frame.

6. A decoder for decoding three-dimensional (3D) content comprising:

at least one processor; and a memory storing instructions that, when executed by the at least one processor, cause the decoder to perform:

extracting a video frame from a video, wherein the video frame includes connectivity information associated with the 3D content; and reconstructing the 3D content based on the connectivity information, wherein the reconstructing comprises:

determining an end of the connectivity information with respect to a block based on a termination connectivity coding unit (CCU) in the block, wherein the termination CCU includes information indicative of a duplicated face; and determining an end of the connectivity information with respect to a mesh frame based on a termination block in the mesh frame.

7. The decoder of claim 6, wherein the termination block includes a restricted sequence of bits.

8. The decoder of claim 6, wherein the termination block includes a CCU that includes all zero information.

9. The decoder of claim 6, wherein the termination block starts with a CCU with information indicative of a termination signal.

10. The decoder of claim 6, wherein the termination block comprises information for rendering the mesh frame.

11. A method for decoding three-dimensional (3D) content comprising:

extracting a video frame from a video, wherein the video frame includes connectivity information associated with the 3D content; and reconstructing the 3D content based on the connectivity information, wherein the reconstructing comprises:

determining an end of the connectivity information with respect to a block based on a termination connectivity coding unit (CCU) in the block, wherein the termination CCU includes information indicative of a duplicated face; and determining an end of the connectivity information with respect to a mesh frame based on a termination block in the mesh frame.

12. The method of claim 11, wherein the termination block includes a restricted sequence of bits.

13. The method of claim 11, wherein the termination block includes a CCU that includes all zero information.

14. The method of claim 11, wherein the termination block starts with a CCU with information indicative of a termination signal.

15. The method of claim 11, wherein the termination block comprises information for rendering the mesh frame.

* * * * *